United States Patent
MacWilliams et al.

(10) Patent No.: US 7,872,892 B2
(45) Date of Patent: Jan. 18, 2011

(54) IDENTIFYING AND ACCESSING INDIVIDUAL MEMORY DEVICES IN A MEMORY CHANNEL

(75) Inventors: Peter MacWilliams, Aloha, OR (US); James Akiyama, Beaverton, OR (US); Kuljit S. Bains, Olympia, WA (US); Douglas Gabel, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 128 days.

(21) Appl. No.: 11/174,236

(22) Filed: Jul. 5, 2005

(65) Prior Publication Data

US 2007/0008328 A1 Jan. 11, 2007

(51) Int. Cl.
*G11C 5/00* (2006.01)
*G11C 7/00* (2006.01)

(52) U.S. Cl. .............. 365/52; 365/189.12; 365/230.03; 365/233.1; 365/233.13; 365/236; 365/240; 710/22; 710/122

(58) Field of Classification Search .................. 365/52, 365/189.12, 230.03, 230.08, 233, 236, 240, 365/233.1, 233.13; 345/582; 710/22, 122
See application file for complete search history.

(56) References Cited

U.S. PATENT DOCUMENTS

| | | | | |
|---|---|---|---|---|
| 5,283,885 A | * | 2/1994 | Hollerbauer | 365/52 |
| 5,404,475 A | * | 4/1995 | Fujisono et al. | 365/52 |
| 5,687,135 A | * | 11/1997 | Olivo et al. | 365/189.12 |
| 5,748,559 A | * | 5/1998 | Raza et al. | 365/189.12 |
| 6,301,159 B1 | * | 10/2001 | Pan | 365/189.12 |
| 6,778,181 B1 | * | 8/2004 | Kilgariff et al. | 345/582 |
| 6,788,560 B2 | * | 9/2004 | Sugano et al. | 365/52 |
| 6,948,014 B2 | * | 9/2005 | Dietrich et al. | 365/189.12 |
| 7,240,160 B1 | * | 7/2007 | Hetherington et al. | 711/122 |
| 7,389,366 B2 | * | 6/2008 | Core | 710/22 |
| 2002/0147877 A1 | | 10/2002 | Farmwald et al. | |
| 2003/0122837 A1 | | 7/2003 | Saxena et al. | |

OTHER PUBLICATIONS

International Preliminary Report on Patentability—PCT/US2006/025757 Jan. 9, 2008.
Office Action for European Patent Application No. 06 774 396.3-1229 mailed Nov. 12, 2008, 7 pgs.
Imagination Technologies, "POWERVR MBX—Technology Overview", Version 1.5f, May 6, 2009, Copyright 2009 Imagination Technologies Ltd., 17 pages.
First Office Action for Chinese Patent Application No. 200610137509.6 mailed Jan. 8, 2010, 16 pgs.
Notice of Preliminary Rejection for Korean Patent Application No. 10-2007-7030913 mailed Oct. 6, 2009, 21 pgs.

(Continued)

*Primary Examiner*—Trong Phan
(74) *Attorney, Agent, or Firm*—Blakely, Sokoloff, Taylor & Zafman LLP

(57) ABSTRACT

In one embodiment of the invention, a memory integrated circuit is provided including a memory array, a register, and control logic coupled to the register. The memory array in the memory integrated circuit stores data. The register includes one or more bit storage circuits to store one or more identity bits of an identity value. The control logic provides independent sub-channel memory access into the memory integrated circuit in response to the one or more identity bits stored in the register.

15 Claims, 17 Drawing Sheets

OTHER PUBLICATIONS

PCT International Search Report for PCT Appln No. US2006/025757, mailed Jan. 25, 2007 (5 pages).

PCT Written Opinion for PCT Appln No. US2006/025757, mailed Jan. 25, 2007 (7 pages).

* cited by examiner

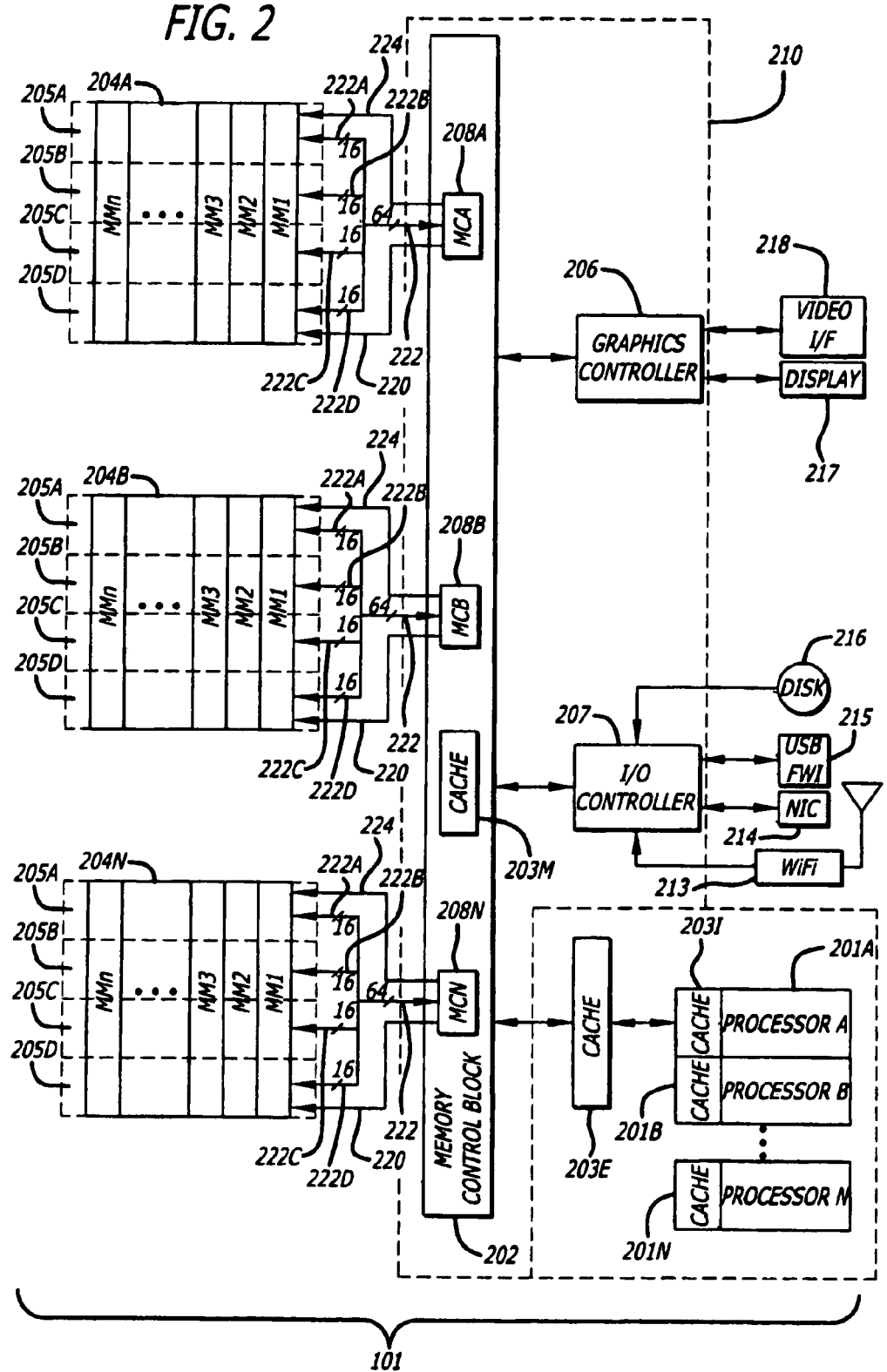

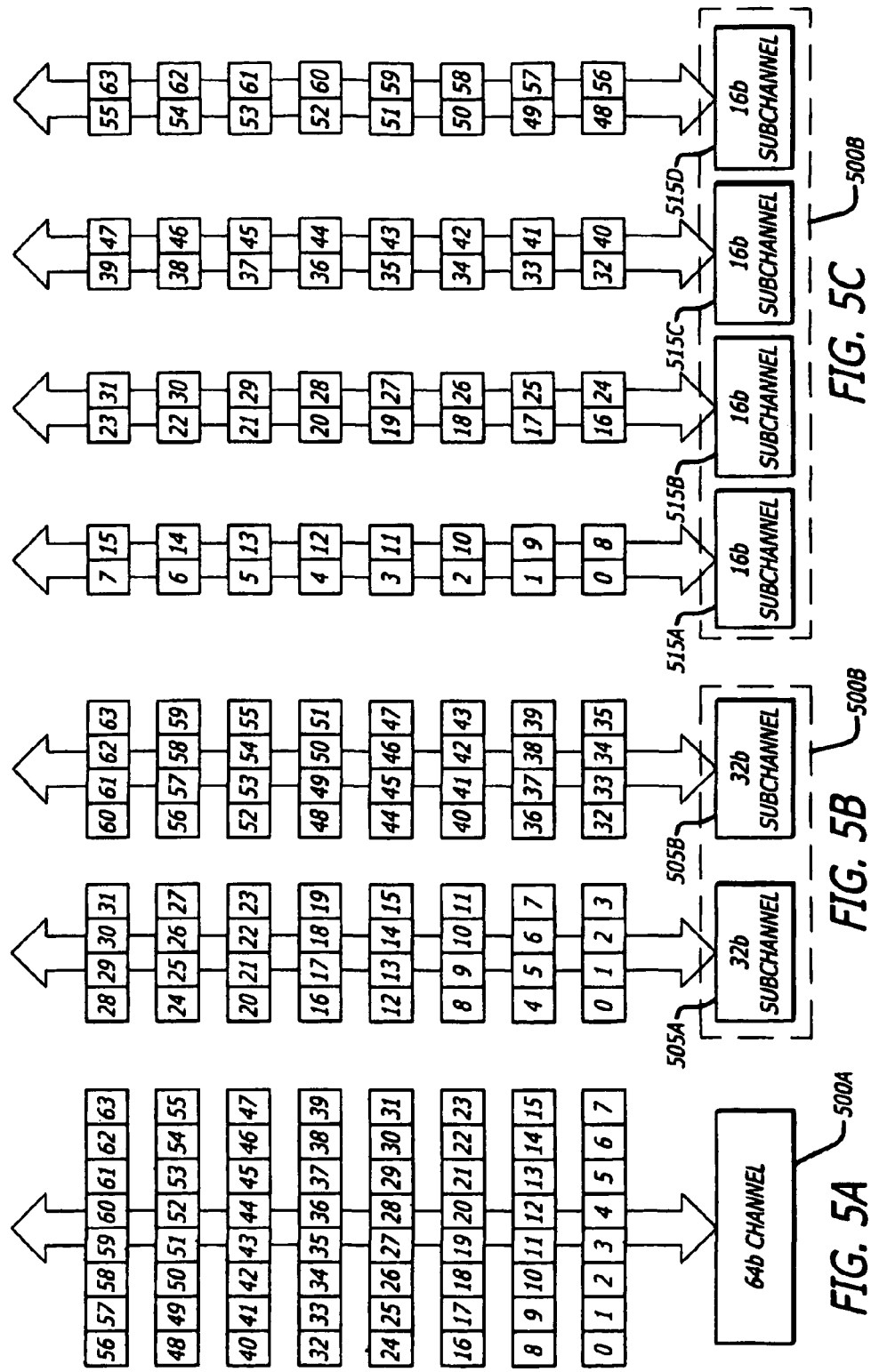

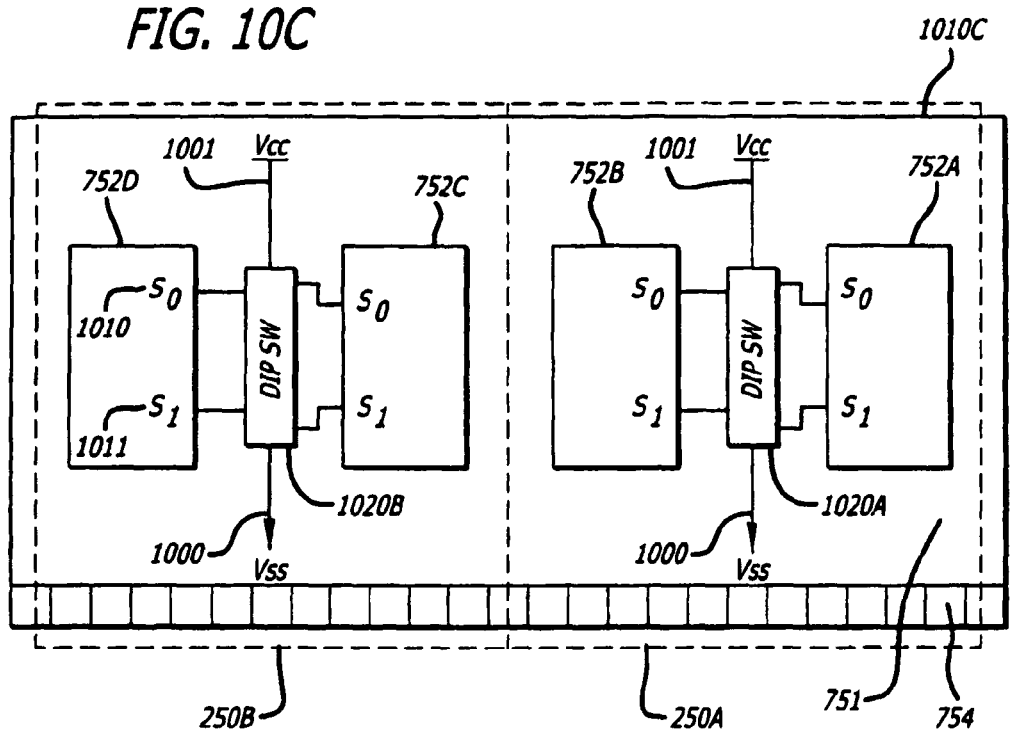

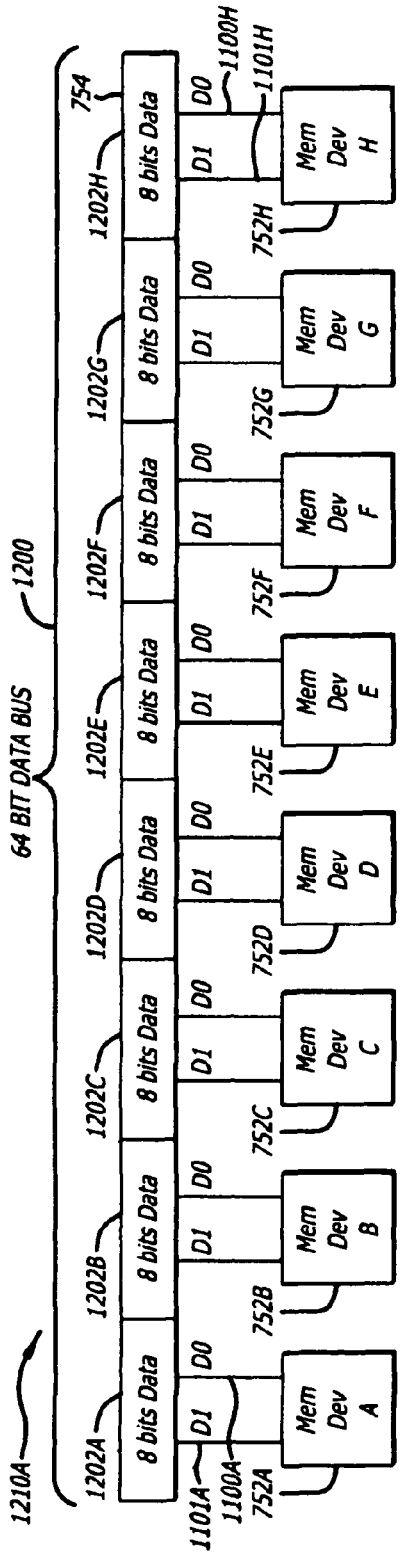
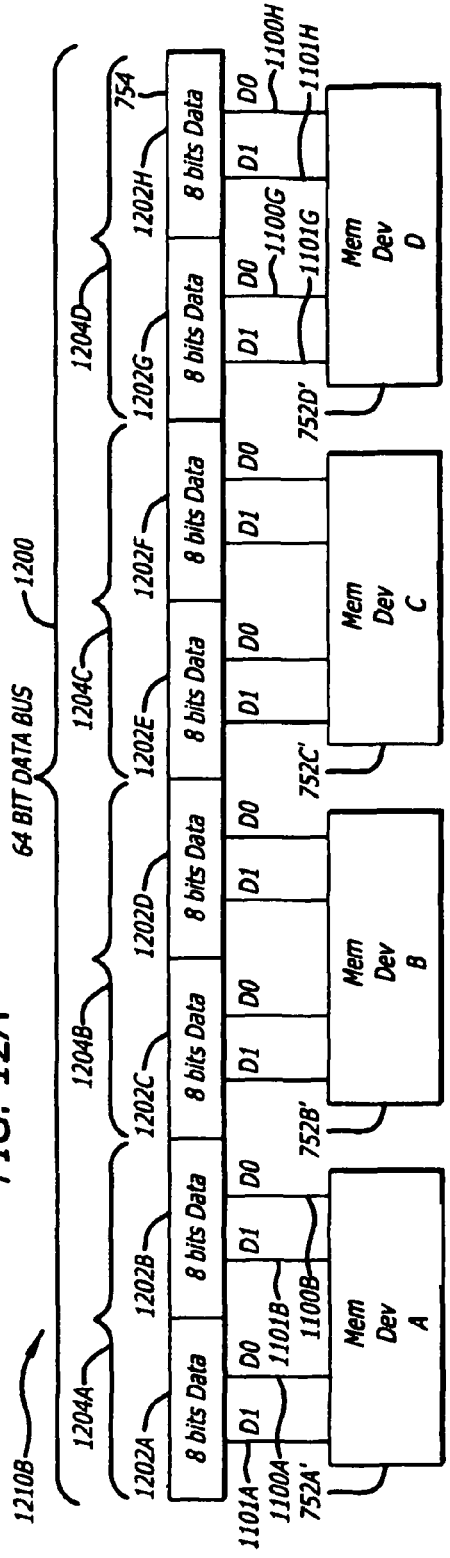
FIG. 12A
FIG. 12B

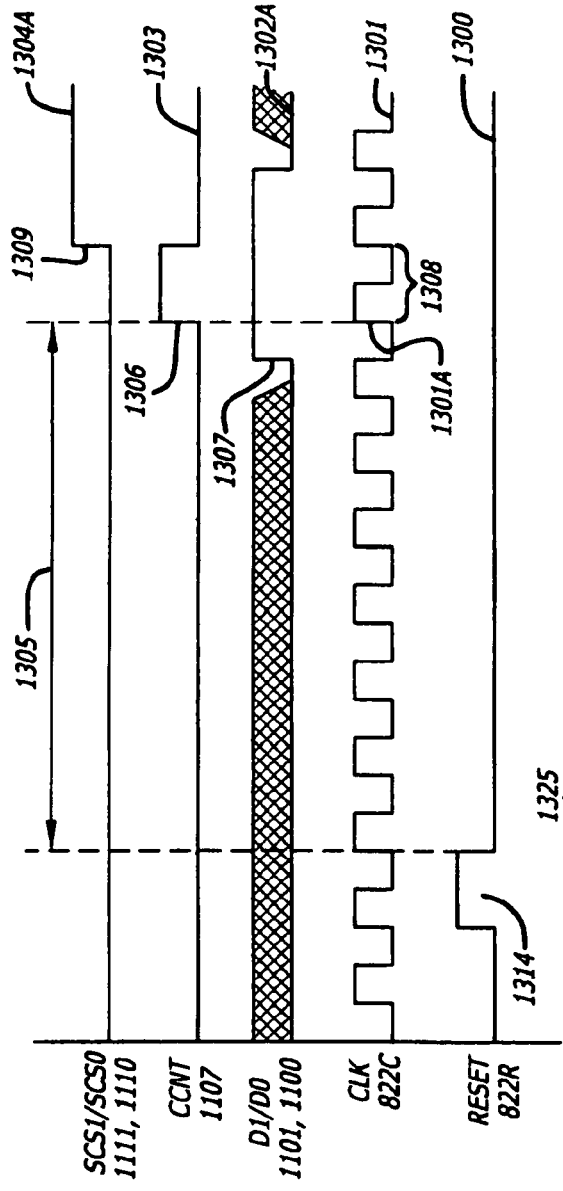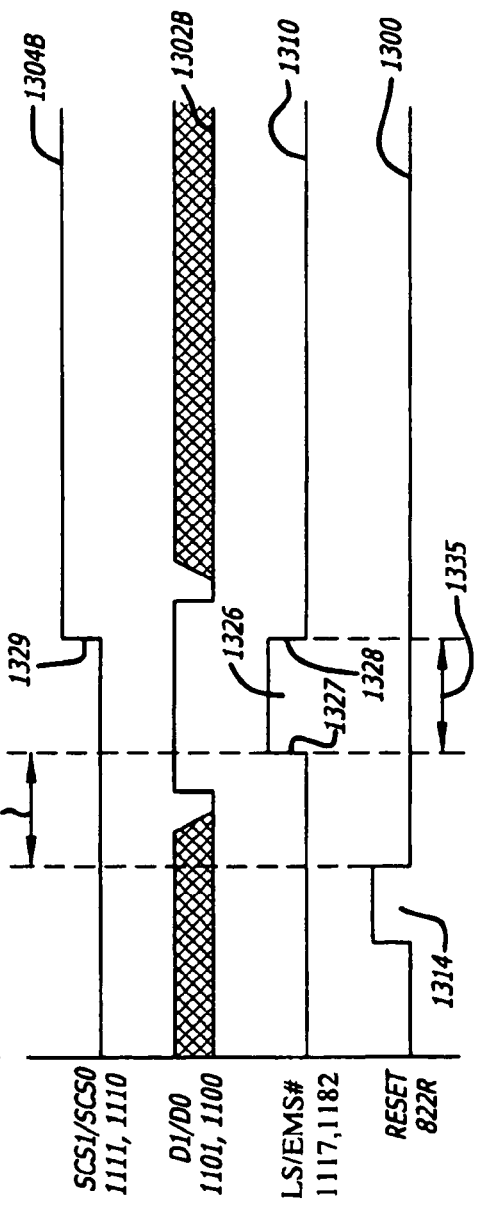
FIG. 13A
FIG. 13B

US 7,872,892 B2

IDENTIFYING AND ACCESSING INDIVIDUAL MEMORY DEVICES IN A MEMORY CHANNEL

FIELD

Embodiments of the invention relate generally to memory and specifically to assigning identification numbers to memory integrated circuits of memory modules to support independent sub-channel memory accesses into memory channels.

BACKGROUND INFORMATION

In a memory architecture with a uniform or unified memory access, sometimes referred to as a unified memory architecture (UMA), a processor and a graphic controller share system memory to lower costs. Typically, a UMA memory architecture may be optimized to handle memory requests (read/write accesses) from the processor into the system memory. The typical UMA memory architecture compromises the memory requests made by the graphics controller. Today, graphics performance has become more important to support three dimensions (3D) as well as higher resolution.

In the typical UMA memory architecture, cache memory uses a fixed sixty four (64) byte cache-line to support memory requests made by both the processor and memory requests made by the graphics controller. A typical memory controller in a UMA memory architecture has one or two memory channels. Each memory channel shares all address lines in an address bus with each memory module in order to perform read or write accesses. The data bus in the typical memory channel is typically sixty-four (64) bits wide so that eight (8) bytes of contiguous data for a given address are accessed from memory at the same time. The bits of the data bus may be routed to memory modules in different ways depending upon the type of memory and memory size utilized.

While a processor typically uses all 64 bits of contiguous data accessed from the memory, a graphics controller typically may not. Much of the contiguous data may be discarded when a graphics controller makes a memory request in a UMA memory architecture. Thus, the bandwidth of the memory channel may be inefficiently used by memory requests issued by the graphics controller in the typical UMA memory architecture.

BRIEF DESCRIPTION OF THE DRAWINGS

The features of the embodiments of the invention will become apparent from the following detailed description in which:

FIG. 2 illustrates a block diagram of a first central processing unit in which embodiments of the invention may be utilized.

FIG. 5A is a diagram illustrating a linear sixty-four byte memory access over a sixty four bit wide memory channel.

FIG. 5B is a diagram illustrating independent sub-channel memory access of a pair of thirty-two byte memory accesses over a pair of thirty-two bit wide memory sub-channels.

FIG. 5C is a diagram illustrating independent sub-channel memory access of four sixteen byte memory accesses over four of sixteen bit wide memory sub-channels.

FIG. 10C illustrates a block diagram of a multi-chip memory module and one or more dipswitches to assign and identify memory integrated circuits with a plurality of sub-channels in a memory channel.

FIG. 12A illustrates one exemplary alignment of data bits D0 and D1 in data bytes into a first plurality of memory integrated circuits in a memory module.

FIG. 12B illustrates a second exemplary alignment of data bits D0 and D1 in data bytes into a second plurality of memory integrated circuits in a memory module.

FIG. 13A is a timing diagram for the control circuitry of FIG. 11C.

FIG. 13B is a timing diagram for the control circuitry of FIG. 11D.

Like reference numbers and designations in the drawings indicate like elements providing similar functionality.

DETAILED DESCRIPTION

Figure 1A:
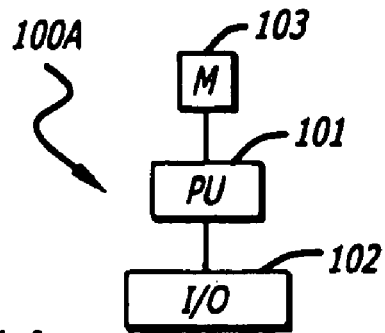
FIG. 1A illustrates a block diagram of a typical computer system in which embodiments of the invention may be utilized.

In the following detailed description of embodiments of the invention, numerous specific details are set forth in order to provide a thorough understanding of the invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

The memory efficiency of an integrated graphics computer system is typically limited due to the size of a cache-line. Quite often the ideal memory access size for graphics is four to sixteen bytes of data since graphics processors operate on one or a few pixels or texels at a time. However, UMA memory architectures are optimized for a 64 byte cache-line to optimize processor memory efficiency. With a 64 byte cache-line, memory requests by a graphics controller result, on average, in a significant amount of data fetched from memory and never used by the graphics controller. The unused data may be referred to as over-fetch.

With micro-tiling, the over-fetch of memory requests from a graphics controller can be reduced while preserving cache-line requirements in a UMA memory architecture with an integrated graphics controller. Generally, micro-tiling uses a new memory architecture and a new memory controller architecture. To support a micro-tiling memory architecture, the new memory subsystem provides independent sub-channel memory accesses within a memory channel. These independent sub-channel memory accesses into a memory may be referred to as micro-tile or micro-tiled memory accesses and generally referred to as micro-tiling.

While the new memory controller and memory architectures are described, the focus of this application is on loading identity values into memory integrated circuits on memory modules to support micro-tiling.

Memory integrated circuits in a memory array may be assigned a value that is unique among the other memory integrated circuits in the same memory array. The embodiments of the invention include an identifier and provide a mechanism to set the value of the identifier. The identifier may be referred to as an identity value having identity bits.

One application of the identity value is for independent sub-channel memory access, also referred to as micro-tile memory access. The embodiments of the invention, allow sub-channel select bits to be loaded into a register within each memory integrated circuit of each memory module in each memory channel.

In one embodiment of the invention, a method is disclosed including providing a memory module with a plurality of memory integrated circuits, each of the plurality of memory integrated circuits having at least two pins to couple information into the memory integrated circuit; setting values of at least two identity bits respectively onto the at least two pins of one memory integrated circuit; receiving the at least two identity bits into the one memory integrated circuit as an identity value; and qualifying a function of the at least one memory integrated circuit with the at least two identity bits.

In another embodiment of the invention, a memory integrated circuit is provided including a memory array, a register, and control logic coupled to the register. The memory array in the memory integrated circuit stores data. The register includes one or more bit storage circuits to store one or more identity bits of an identity value. The control logic provides independent sub-channel memory access into the memory integrated circuit in response to the one or more identity bits stored in the register.

In yet another embodiment of the invention, a memory module is disclosed including a printed circuit board with an electrical connector to couple to a host printed circuit board, and a plurality of memory integrated circuits mounted to the printed circuit board and coupled to the edge connection. The electrical connector includes a power connection and a ground connection. Each of the memory integrated circuits mounted to the module include a memory array to store data; a register including one or more bit storage circuits having a data input coupled to bits of a data bus, and control logic coupled to the register. The register stores one or more sub-channel select bits on the bits of the data bus in response to a load signal. The control logic provides independent sub-channel memory access into the memory integrated circuit in response to the one or more sub-channel select bits stored in the register.

Figure 3A:
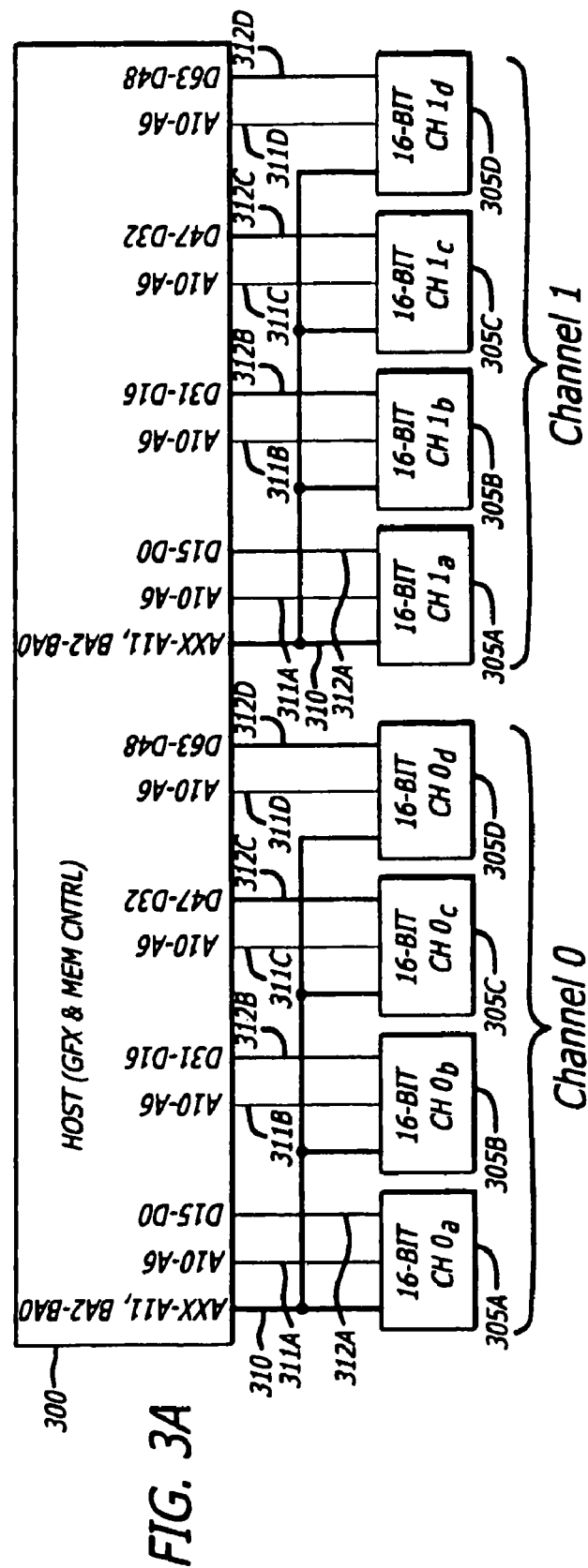
FIG. 3A illustrates a high level block diagram of a memory control block coupled to a pair of memory channels each including four memory sub-channels.

Briefly stated, micro-tiling enables a memory request to be composed of smaller requests for discontiguous sections or chunks of memory. The micro-tiling memory architecture allows read and write memory fetches to vary in size and structure based on the needs of the requestor. In order for the smaller chunks to be correctly identified, additional address information is provided into the system memory by the micro-tiled memory controller. For example, in one embodiment of the invention a sixty-four bit wide memory channel (the physical bit width) may be divided up into four sixteen bit wide sub-channels. In this implementation, a sixty-four byte memory access (the logical byte width of a memory channel) is composed of four discontiguous sixteen byte chunks (assuming that a memory transaction is a burst of 8 transfers). Each sub-channel uses some unique address information. FIG. 3A is an exemplary implementation of four sixteen bit sub-channels, each having some unique address information. Other implementations of a micro-tile memory architecture can vary the size of each sub-channel and the number of independent address lines provided into each sub-channel.

There are several methods available to supply additional independent address information to each sub-channel of the memory array including supplying additional address lines by routing new dedicated lines from the memory controller to the memory integrated devices or re-targeting unused error correction code (ECC) signal lines routed in a memory module to be additional address lines. The independent additional address information may also be supplied by overloading pre-existing address signal lines during typical periods of non-use, such as during a memory cycle when the column addresses are written into memory integrated circuits. In this case, micro-tiling support can be implemented in memory modules and still provide backward compatibility to pre-existing memory module implementations. These methods may be used separately, or in combination in embodiments of the invention to provide the additional address information over a desired number of address lines, including any additional address lines.

In a standard memory channel, such as a memory channel based on double data rate (DDR) DRAM technology, the logical width of the memory channel can be considered to be M bytes wide. There are eight bits in a byte of data. The logical width of the memory channel is somewhat related to the burst length of data transfers over a memory module. That is, M bytes of data can be consecutively accessed by data transfers that form a burst, by using consecutive addresses incremented from a base address. Typically, the base address of the block of bytes to be accessed (read or written) is an integer multiple of the logical width of the channel. The physical width of the memory channel is the bit width of the data bus between the memory controller and the memory modules. The typical minimum burst length may be eight memory cycles with a starting byte order that may be set by the least significant bits of the address lines. With a typical physical width of sixty-four bits, eight memory cycles accesses sixty-four bytes of data in a memory channel. Thus the typical logical width of the memory channel is sixty-four bytes of data.

As discussed previously, the logical width of the memory channel is the number of bytes that can be consecutively transferred with a base address and the physical width of the memory channel is the bit width of the data bus ("$W_{DB}$") between the memory controller and the memory modules. A micro-tiled memory system equally divides the logical width and the physical width of the memory channel into sub-channels having smaller logical byte widths and smaller physical bit widths.

The micro-tiling of memory breaks the physical width of the memory channel ($W_{DB}$ bits) and the logical width of the memory channel (M bytes) into S sub-channels ($W_{SC}$). Each sub-channel has a physical width of $W_{SC}=W_{DB}/S$ bits and a logical width of $N=M/S$ bytes. Thus, N bytes of data may be transferred over $W_{SC}$ bits of data lines in each sub-channel for each burst of data transfers. A memory channel may have a total number of memory locations $T_{ML}$ to access in memory. Each sub-channel accesses a subset of the total memory locations ($T_{SML}$) of a memory channel where $T_{SML}=T_{ML}/S$.

In micro-tiling memory, each sub-channel can access a smaller granularity of data over the memory channel independently from each other. To make them completely independent, separate address signal lines may be routed from the memory controller to each sub-channel. To avoid routing too many separate address signal lines, some address signal lines may be shared across the sub-channels so that memory locations can be independently selected from a set of common addresses. Thus, the address that is presented to each sub-channel has a number of independent address bits ("I") whose value can be different from corresponding bits in the addresses presented to the other sub-channels. Thus, while the data transferred on each sub-channel represents a contiguous block of data, the blocks of data on each sub-channel are not necessarily formed from a contiguous address range. This is because the independent address bits I may be from different bit positions, as is discussed further below.

Figure 1B:
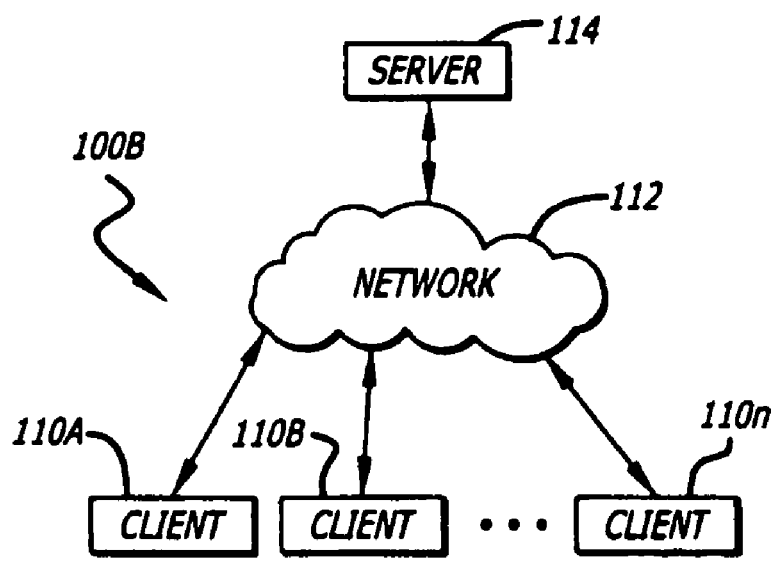
FIG. 1B illustrates a block diagram of a client-server system in which embodiments of the invention may be utilized.

The embodiments of the invention may be used in different systems such as those illustrated in FIGS. 1A-1B. Referring now to FIG. 1A, a block diagram of a typical computer system 100 in which embodiments of the invention may be utilized is illustrated. The computer system 100A includes a processing unit 101; input/output devices (I/O) 102 such as keyboard, modem, printer, external storage devices and the like; and monitoring devices (M) 103, such as a CRT or graphics display. The monitoring devices (M) 103 may provide computer information in a human intelligible format such as visual or audio formats. The system 100 may be a number of different electronic systems other than a computer system.

Referring now to FIG. 1B, a client server system 100B in which embodiments of the invention may be utilized is illustrated. The client server system 100B includes one or more clients 110A-110M coupled to a network 112 and a server 114 coupled to the network 112. The clients 110A-110M communicate with the server 114 through the network 112 in order to transmit or receive information and gain access to any database and/or application software that may be needed on the server. The clients 110A-110M and the server 114 may be instances of the typical computer system 100A. The server 114 has a processing unit with memory and may further include one or more disk drive storage devices. The server 114 may be used in a storage area network (SAN) as a network attached storage (NAS) device, for example, and have an array of disks. The data access to the server 114 may be shared over the network 112 with the multiple clients 110A-110C.

Referring now to FIG. 2, a detailed block diagram of a processing unit 101 in which embodiments of the invention may be utilized is illustrated. The processing unit 101 may include a processor circuit 201, a memory control block 202, external cache memory 203E, one or more memory channels 204A-204N, a graphics controller 206, and an input/output controller 207 coupled together as shown. A combination of two or more elements of the processor circuit 201, the memory control block 202, the cache memory 203E, the graphics controller 206, and the input/output controller 207 of the processing unit 101 may be integrated together into a single integrated circuit. For example, the memory control block 202, the graphics controller 206, and the input/output controller 207 may be integrated together as an integrated circuit 2 10. As another example, the processor circuit 201, the memory control block 202, the cache memory 203E, the graphics controller 206, and the input/output controller 207 may be integrated together as an integrated circuit 210. As another example, the memory control block 207 with its memory controller may be integrated into the processor circuit 201. While the external cache memory 203E coupled between the processor circuit 201 and the memory control block 202 is illustrated as being part of the integrated circuit 210, it may be a separate circuit. Oftentimes, the cache memory 203E remains external to the integrated circuit 210 as it is more efficient to manufacture large memory capacities separately.

The processor circuit 201 may include one or more execution units or more than one processor (also referred to as core processors), such as processors A-N 201A-201N, as a multi-processor integrated circuit. Each processor of the processor circuit 201 may have one or more levels of an on-chip or internal cache memory 203I or share the same internal cache memory. Other levels of cache memory may be external to the processor 201 and interface to the memory controller, such as external cache memory 203E. The processor circuit 201 may also have an on-chip or internal random access memory (RAM) and an on-chip or internal read only memory (ROM) as a microcomputer may have. The processor 201, its one or more execution units, and the one or more levels of cache memory may read or write data (including instructions) through the memory control block 202 with the one or more memory channels 204A-204N.

The memory control block 202, coupled to and between the one or more memory channels 204A-204N and the processor 201 as well as the graphics controller 206, may optionally have its own internal cache memory 203M or it may be external as another level of cache memory. The memory control block 202 includes one or more micro-tile memory controllers MCA-MCN 208A-208N for each of the respective one or more memory channels 204A-204N.

Each of the one or more memory channels 204A-204N includes one or more memory modules MM1-MMn. Each memory module includes one or more memory integrated circuits or devices. The one or more memory integrated circuits or devices may be various types of memory integrated circuits including dynamic random access memory (DRAM) circuits, static random access memory (SRAM) circuits, or nonvolatile random access memory (NVRAM) circuits. However, in the preferred embodiment of the invention, the one or more memory integrated circuits are dynamic random access memory (DRAM) circuits.

Each of the one or more memory channels 204A-204N includes two or more memory sub-channels. In FIG. 2, four memory sub-channels 205A-205D are included in each memory channel 204A-204N. While four memory sub-channels are illustrated in each memory channel it is understood that other divisions of a memory channel may be had including even or odd numbers of sub-channels, such as two memory sub-channels. The divisions of a memory channel may particularly change as the logical width or burst lengths of a memory channel increases.

The one or more memory modules MM1-MMN in each memory channel 204A-204N may be configured to support micro-tiling. An algorithm may be used by the memory control block to determine whether or not the one or more memory modules support micro-tiling. The one or more memory circuits or devices included on the one or more memory modules may be configured to support micro-tiling. The one or more memory circuits can be micro-tiled enabled (MTE) and assigned to support a specific memory sub-channel. The one or more memory circuits may include additional pins or have additional bits in a mode register to be micro-tiled enabled and assigned to a specific memory sub-channel. In the case of additional pins being provided by the memory circuits, external jumper pins, jumper wires, or micro-switches (for example, DIP switches) may be used to configure micro-tiling support. In the case of the mode register being provided in the memory circuits, the independent portion of the data bus into each sub-channel may be used to load the mode register with an appropriate loading strobe.

The I/O controller 207 may be coupled to the memory control block 202 to write data into the one or more memory channels 204A-204N so it is accessible by the processor 201. The processing unit 101 may further include a wireless network interface circuit (WNIC) 213, a wired network interface circuit or card (NIC) 214, a universal serial bus (USB) and/or firewire (FW) serial interface 215, and/or a disk drive 216 coupled to the I/O controller 207. The wireless network interface circuit (WNIC) 213 provides a radio connection to a base radio unit such as through a wireless local area networking, wifi (IEEE 802.11), Bluetooth, or other radio connection. The wireless networking interconnection (WNIC) 213 includes an antenna to couple by radio waves to a base radio unit or other mobile radio unit. The NIC 214 provides an Ethernet wired local area network connection. The USB/FW serial interface 215 allows for expansion of the system to include other I/O peripheral devices. The disk drive 216 is well known and provides rewriteable storage for the processor 201. The disk storage device 216 may be one or more of a floppy disk, zip disk, DVD disk, hard disk, rewritable optical disk, flash memory or other non-volatile storage device.

The graphics controller 206 is coupled to the memory control block 202 to read and write data into the one or more memory channels 204A-204N. The processor 201 may write data into the one or more memory channels 204A-204N so that it is accessible by the graphics controller 206 and displayable on a graphics display or video device. A graphics display 217 may be coupled to the graphics controller 206. A video interface 218 may couple to the graphics controller 206. The video interface 218 may be an analog and/or digital video interface.

In the processing unit 101, the processor 201, the I/O controller 207, and the graphics controller 206 may access data in the one or more memory channels 204A-204N through memory controllers in the memory control block 202. The memory controllers in the memory control block interface to a respective memory channel 204A-240N to read and write data between the system memory and the processor 201, the I/O controller 207, and the graphics controller 206. In interfacing the micro-tiled memory controllers 208A-208N to the memory channels 204A-204N, respectively, there may be address signal lines 220 of an address bus, data signal lines 222 of a data bus, and control and clocking signal lines 224 as part of the memory interface. The input devices coupled to the I/O controller 207, such as the disk storage device 216, may also read and write information into the system memory.

Generally, the data signal lines 222 of the data bus are divided out into the S sub-channels. In FIG. 2, where S is four, the data signal lines 222 of the data bus are divided out into four sub-channels as illustrated by the sub-channel data lines 222A, 222B, 222C, and 222D and coupled into the respective sub-channels 205A, 205B, 205C, and 205D. For example, a sixty four-bit bus is divided into four sets of sixteen bit data lines. Some of the address signal lines 220 may be shared into the sub-channels while other address signal lines are independent from one sub-channel to the next, in one embodiment of the invention. In another embodiment of the invention, the address signal lines 220 may be fully independent into each sub-channel. The address signal lines are further described below.

Referring now to FIG. 3A, a block diagram of a two memory channels is illustrated. FIG. 3A illustrates a combined graphics and memory controller 300 (HOST (GFX & MEM CNTRL)), also referred to as a host 300, coupled to a memory channel 0 304A and a memory channel 1 304B. Memory channel 0 304A and memory channel 1 304B are each divided into four sub-channels 305A, 305B, 305C, and 305D. Each memory channel has an independent micro-tile memory controller to support the sub-channels of the memory channel. Each memory channel has an independent data bus. For example assuming a total data bit width of 64 bits for each data bus of the memory channels, each sub-channel is coupled to an independent set of 16 bits of the data bus. Sub-channel 305A is coupled to data bits D15-D0, sub-channel 305B is coupled to data bits D31-D16, sub-channel 305C is coupled to D47-D32, and sub-channel 305D is coupled to data bits D63-D48 as is illustrated in FIG. 3A.

As previously discussed, some address signal lines may be shared into each of the sub-channels while other address signal lines are independent from one sub-channel to the next, in one embodiment of the invention. For example, address signal lines 310 (labeled Axx-A11, BA2-BA0) are shared to all sub-channels 305A-305D. That is, each of the address signal lines 310 may be fanned out and coupled into each sub-channel. In contrast, address signal lines 311A (first set labeled A10-A6) are independently coupled into sub-channel 305A. Address signal lines 311B (second set labeled A10-A6) are independently coupled into sub-channel 305B. Address signal lines 311C (third set labeled A10-A6) are independently coupled into sub-channel 305C. Address signal lines 311D (fourth set labeled A10-A6) are independently coupled into sub-channel 305D.

Ideally, enough independent address lines are provided to allow full addressability within the allocated memory page size granularity. The page size is typically set by software managing the graphic memory space. For example consider the case of a 4 kilo-byte (KB) page size allocation in a two-channel cache-line interleaved memory subsystem. 2 KB of the page are mapped to each memory channel. In which case, five address lines may be used to address thirty-two 64B cache lines in each physical page of memory. Thus, fifteen additional independent address lines would be ideal for a four sixteen bit sub-channel implementation. These are shown as address signal lines 311B-D respectively labeled as the second, third, and fourth sets of address lines labeled A10-A6 over the original first set of address signal lines 311A labeled as the first set of address lines A10-A6. If fewer additional independent address lines are made available, the independent address space addressable by each sub-channel is reduced. If more independent address lines are made available into each sub-channel, the independent address space addressable by each sub-channel is increased. To implement two thirty-two bit sub-channels, it is desirable to have five additional independent address lines.

Extra address signal lines may be routed between the memory controller and the sub-channels to provide the independent address signal lines as illustrated in FIG. 3A. Address signals may be overloaded onto the pre-existing address lines. A combination of routing extra address signal lines and overloading of address signals may be used to support micro-tiling. Alternatively, each sub channel may be provided with a complete set of independent address lines without the shared address lines 310 illustrated in FIG. 3A. However, using the shared address signal lines 310 conserves printed circuit board area by avoiding the routing of independent address signal lines.

Figure 6:
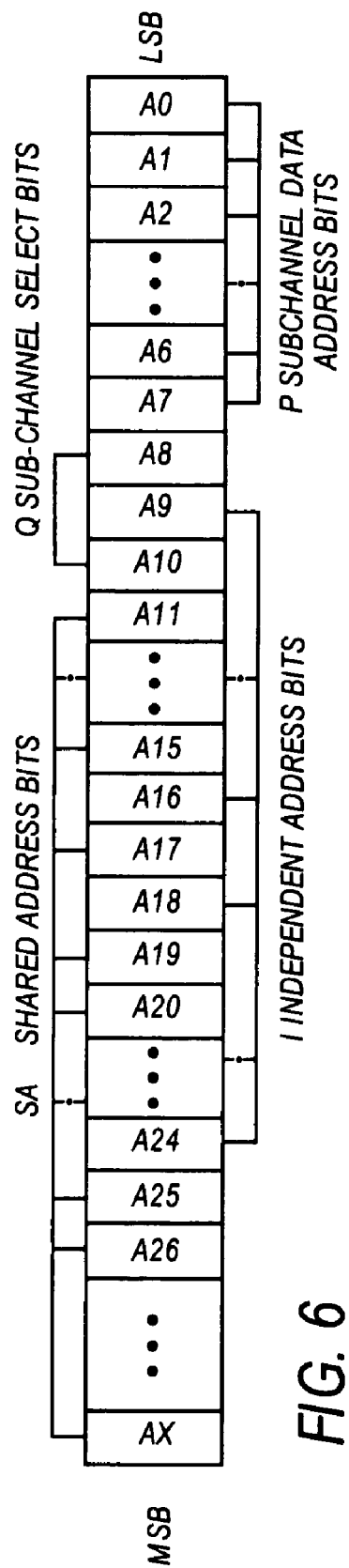
FIG. 6 illustrates an address signal line bit map for a memory channel.

Referring momentarily to FIG. 6, an address signal line bit map for a memory channel is illustrated using shared and independent address bits. That is, FIG. 6 is an address bit map that illustrates the interpretation of the address bits in a physical address from the least significant bit (LSB) to the most significant bit (MSB). A set of I independent address bits (IAB) is provided to each sub-channel to support micro-tiling. A set of zero or more SA shared address bits (SAB) may be provided to all of the sub-channels. A set of Q sub-channel select bits (SSB) are used in the assignment of a memory request to a sub-channel. A set of P sub-channel data address bits (SDAB) are used to address the bytes in each cache-line within a DRAM memory. The set of P SDAB bits are typically the least significant bits of the address signal line map. The set of Q SSB bits and the P SDAB bits are not actually routed between the memory controller and the sub-channel memory, it being understood that the base address of the block of data being accessed is an integer multiple of the burst size. That is, the P SDAB bits may be generated internally by a memory integrated circuit such as by a DRAM device in accordance with double data rate (DDR) memory specifications. While FIG. 6 illustrates certain address bits being chosen to be shared and independent address bits, other address bits may be assigned instead. That is, the division of the address bits above the P sub-channel data address (SDAB) bits into the SA shared address (SAB) bits and the I independent address (IAB) bits in general is arbitrary.

Figures 4A, 4B, 4C:
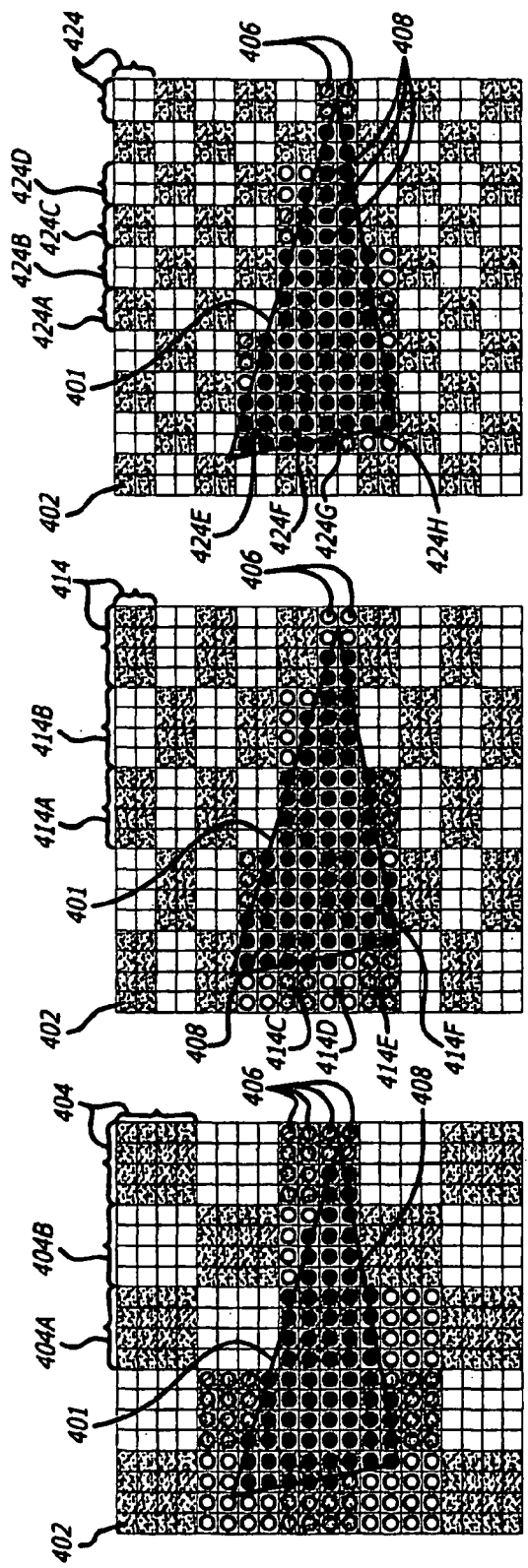
FIG. 4A is a diagram illustrating the mapping of pixels on a video display to memory accesses over a memory channel without sub-channels using a linear memory access.
FIG. 4B is a diagram illustrating the mapping of pixels on a video display to memory accesses over a memory channel with two sub-channels supporting a micro-tiling memory access.
FIG. 4C is a diagram illustrating the mapping of pixels on a video display to memory accesses over a memory channel with four sub-channels supporting a micro-tiling memory access.

Referring now to FIGS. 4A-4C, idealized pixel map renderings of a triangle are illustrated using a tiled address space. FIG. 4A illustrates the rasterization of the triangle 401 in a tiled address space using a non-micro-tiled memory system in which the logical channel width is 64 bytes. FIGS. 4B-4C illustrate the rasterization of the triangle 401 in a tiled address space using a micro-tiled memory system. The unit of rasterization of the triangle 401 is a fragment 402. A fragment 402 may represent a pixel or a texel. A tiled address space is one in which a logically two-dimensional array of data is organized as a set of sub-arrays, such that the data within the subarray is stored in a contiguous range of the address space and are thus highly localized in memory. A logically two-dimensional array of data that is linearly addressed has no such sub-arrays; instead, data such as fragments 402 are addressed linearly across from left to right in a row and then down to the next row from top to bottom. Thus, vertically adjacent fragments 402 may be far apart in memory.

In comparison with FIG. 4A, FIGS. 4B-4C show how micro-tile memory accesses provide the advantages of smaller memory requests. Each of FIGS. 4A-4C show the rasterization of a triangle 401 for a different memory request size.

In FIG. 4A, a single memory request encompasses the data representing 16 fragments. Each of the individual squares 402 represents a fragment, typically thirty-two bits or four bytes of data per fragment. FIGS. 4A-4C illustrate a 20×20 array of fragments. A 4×4 array of fragments, as illustrated in FIG. 4A, is a span 404 and represents a sixty-four byte memory request. A subspan 424 is illustrated in FIG. 4C as a 2×2 array of fragments or a sixteen byte memory request. A double subspan 414 is illustrated in FIG. 4B and is a 32 byte memory request that is oriented as a 2×4 array of fragments.

The differences between FIGS. 4A-4C illustrate the theoretical reduction in over-fetch as the memory request size decreases. In each of the FIGS. 4A-4C, the triangle 401 requires access of the same number of fragments. However a memory access typically transfers the data of more than one fragment, such that it may include data representing fragments 408 within the triangle 401 and fragments 406 outside the triangle 401. Data representing fragments 406 outside of the triangle 401 are over-fetched, resulting in the inefficient use of the memory bandwidth.

In FIG. 4A, a 64 byte memory access transfers the data of a span 404, a 4×4 block of fragments. For example, span 404A is a first 64 byte memory access. Span 404B is a second 64 byte memory access. For example consider that the triangle 401 encompasses approximately fifty-seven pixels to render. For the 64 byte memory access case, ten memory accesses are needed to access the 65 fragments within the triangle. Data of an additional 95 fragments is accessed but might not be used.

In FIG. 4B, a 32 byte memory access transfers the data of a double sub-span, a 2×4 block of fragments or one-half of a 64 byte memory access. For example, double subspan 414A is a first 32 byte memory access. Double subspan 414B is a second 32 byte memory access. For the 32 byte memory access case, thirteen memory accesses are needed to access the 65 fragments within the triangle. Data of an additional 47 fragments is accessed but might not be used.

In FIG. 4C, a 16 byte memory access transfers the data of a sub-span, a 2×2 block of fragments or one-quarter of a 64 byte memory access. A span 424A is a first 16 byte memory access. A span 424B is a second 16 byte memory access. A span 424C is a third 16 byte memory access. A span 424D is a fourth 16 byte memory access. For the 16 byte memory access case, twenty-two memory accesses are needed to access the 65 fragments within the triangle. Data of an additional 13 fragments is accessed but might not be used.

Consider as another example that the triangle 401 requires sixty-five pixels or fragments (260 bytes) to display in each of FIGS. 4A, 4B and 4C. In FIG. 4A, approximately ten spans of memory are accessed including one-hundred sixty pixels or six-hundred forty bytes of data to render triangle 401. In FIG. 4B, approximately thirteen double subspans of data are accessed including one-hundred twelve pixels or four-hundred forty-eight bytes of data to render triangle 401. In FIG. 4C, approximately twenty-two subspans of data are accessed including eighty-eight fragments or three-hundred fifty-two bytes of data to render triangle 401. Thus in comparison with FIG. 4A, the over-fetched pixels or fragments 406 are reduced in FIGS. 4B and 4C by implementing micro-tile addressing with sub-channels within each memory channel.

As previously discussed, FIGS. 4B-4C illustrate the rasterization of the triangle 401 in a tiled address space using a micro-tiled memory system that includes memory sub-channels. In FIG. 4B, a 64 byte wide memory channel may be formed from two 32 byte wide memory sub-channels. In this case, a micro-tiled memory access combines two discontiguous 32 byte accesses into a single 64 byte access, one on each of the two sub-channels for a total size of 64 bytes. Rasterization of the triangle results in requests to access double subspans 414. For example, the micro-tile memory controller may combine requests to access double subspans 414C and 414D into a single micro-tiled memory access. As another example, the memory controller may combine requests to access double subspans 414E and 414F into a single micro-tiled memory request. Other combinations of requests to access double subspans may be formed into a single micro-tiled memory request or access. In one or more embodiments of the invention, the combined sub-channel accesses have a shared address bit pattern in the SA shared address bits.

In FIG. 4C, a 64 byte wide memory channel may be formed from four 16 byte wide memory sub-channels. In this case, a micro-tiled memory access combines four discontiguous 16 byte accesses into a single 64 byte access, one on each of the four sub-channels for a total size of 64 bytes. Rasterization of the triangle results in requests to access subspans 424. For example, the micro-tiling memory controller may combine requests to access subspans 424E, 424F, 424G, and 424H into a single micro-tiled memory access. Other combinations of requests to access subspans may be formed into a single micro-tiled memory request or access. In one or more embodiments of the invention, the combined sub-channel memory accesses have a shared address bit pattern in the SA shared address bits for each of the four memory sub-channels.

In the ideal case, it is assumed that all micro-tiled memory requests can be utilized by the micro-tile transaction assembler to build 64B memory transactions with no unused sub-channels. That is, the effectiveness of micro-tiling depends on the ability of the transaction assembler 326A,326B to construct fully populated memory transactions.

Figure 3B:
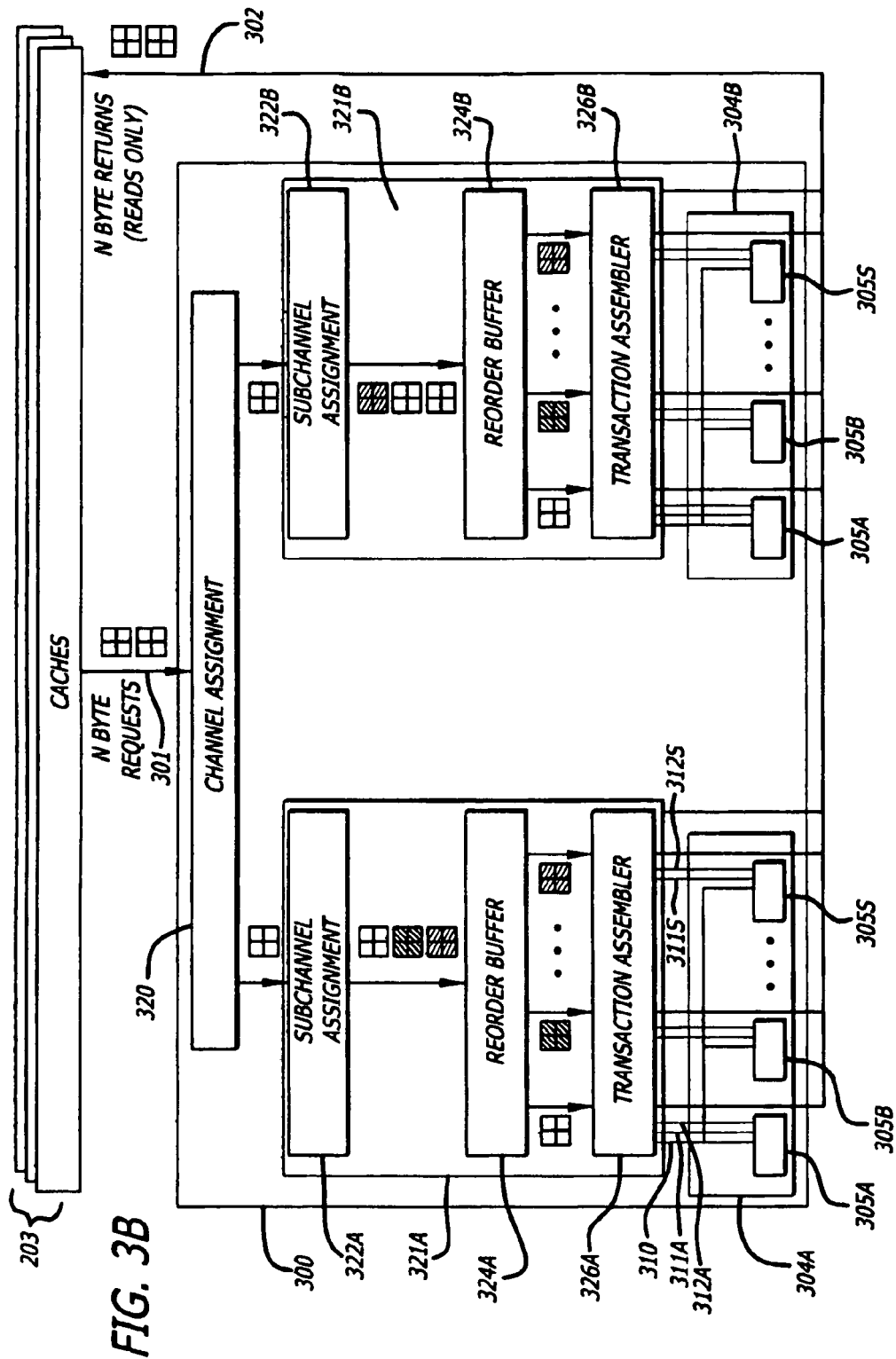
FIG. 3B illustrates a detailed block diagram of memory controllers in a memory control block coupled to cache memory and a pair of memory channels including a plurality of S sub-channels.

Referring now to FIG. 3B, a multi-channel memory subsystem is illustrated including a micro tiled memory control block 300 coupled to the system memory channels and one or more cache memory 203. Within the memory control block 300, the multi-channel memory subsystem includes a micro-tiling memory controller for each memory channel into system memory.

In FIG. 3B, two memory channels 304A and 304B are provided. Thus, two micro-tile memory controllers 321A and 321B are provided for the respective memory channels 304A and 304B. Each memory channel 304A,304B may be composed of S sub-channels 305A-305S. Each sub-channel 305 is logically N bytes wide and B bits wide. Each memory channel 304 is logically M=N*S bytes wide.

Between the memory control block 300 and the cache memory 203 is a write data path 301 and a read data path 302 that can include command paths or address paths over which read and write requests can be made. N bytes are returned to the cache 203 from the memory control block 300 over the read data path 302 in the case of a read transaction. An N byte write request is provided from the cache 203 to the memory control block 300 over the write data path 301 in the case of a write transaction. While an N byte read or write request is made between the cache 203 and the memory control block 300, requests are depicted as arrays of 2×2 tiles to represent a 2×2 array of pixels or texels, such as my be used with four sub-channels.

The memory control block 300 includes a channel assignor 320, a first memory controller 321A, and a second memory controller 321B. The memory control block 300 is also coupled to memory channel zero 304A and memory channel one 304B. Memory channel zero 304A includes "S" sub-channels 305A-305S. Similarly, memory channel one 304B includes "S" sub-channels 305A-305S. Shared address lines 310 couple from each memory controller 322 into each sub-channel 305A-305S. Independent address lines 311A-311S couple into the respective sub-channels 305A-305S. Each of the data bus sub-channel portions 312A-312S is coupled into the respective memory sub-channels 305A-305S.

Each of the memory controllers 321A and 321B include a sub-channel assignor 322A-322B, a reorder buffer 324A-324B, and a transaction assembler 326A-326B respectively.

The memory request for N bytes of data, the logical width of a channel, is coupled into the channel assignor 320. The channel assignor assigns the memory request to either of memory channel 0 304A or memory channel 1 304B depending upon the circumstances including the variability of the memory channel. After being assigned to a memory channel by the channel assignor, the N byte request is coupled into the respective memory controller 321A or 321B and into the sub-channel assignor 322A or 322B.

The sub-channel assignor 322A and 322B assigns the N byte requests to one of the sub-channels 305A-305S. Referring momentarily to FIG. 6, the Identity Sub-channel Assignment, s, may be defined by the following process: (1) The request address, "A", is shifted right by the P SDAB bits, resulting in a new integer value $\tilde{A}$ (where, $\tilde{A}=A>>P$). (2) The value "s" for the Sub-channel Assignment is the least significant Q SSB bits of $\tilde{A}$ (e.g., $s=\tilde{A}\ \&\ ((1<<Q)-1)$).

Each of the micro-tiling memory controllers 321A-321B has a reorder buffer 324A-324B, respectively. The reorder buffer reorders the memory request into the sub-channels so as to increase the bandwidth efficiency in each memory channel. A request to read or write a block of N bytes of data at address "A" enters the memory controller 322A or 322B, is assigned to a sub-channel, and is placed in the reorder buffer. The reorder buffer may be implemented as a reorder queue for each sub-channel. Other implementations of the reorder buffer are possible.

The transaction assembler 326A,326B forms a memory read transaction by selecting S read requests, one for each sub-channel, from the reorder buffer, such that all S requests have the same shared address bits. It forms a memory write transaction by selecting S write requests, one for each sub-channel, from reorder buffer, such that all S requests have the same shared address bits. For example, the transaction assembler 326A,326B may assemble a 64 byte transaction in a memory channel from four 16 byte requests, one to each sub-channel.

When attempting to form a transaction, the transaction assembler in a micro-tiled controller may not be able to find a concurrent set of requests, one for each sub-channel, such that the SA shared address bits are the same across all sub-channels. In such a case, no data may be transferred on a sub-channel for which a request was not found, or if data is transferred over that sub-channel, the data can be discarded.

Referring now to FIGS. 5A-5C, exemplary byte ordering is illustrated for each memory channel 500A-500C. In FIG. 5A, memory channel 500A has a transfer size of 64 bytes numbering from 0 to 63. The logical width of 64 bytes may be accessed by a 64 bit physical width of memory channel.

In FIG. 5B, memory channel 500B may be divided into two memory sub-channels 505A and 505B, each of which transfers one-half of a 64 byte transfer, so that each sub-channel transfers 32 bytes. For memory sub-channel 505A, the memory bytes are that are accesses number from 0 to 31, reordered from that of FIG. 5A. For memory sub-channel 505B, the bytes that are accessed are numbered from 32 through 63, reordered from that of FIG. 5A.

In FIG. 5C, the memory channel 500C may be divided into four memory sub-channels, 515A, 515B, 515C, and 515D, each of which transfers one-fourth of a 64 byte transfer, so that each sub-channel transfers 16 bytes. Memory sub-channel 515A accesses memory bytes numbering from the 0 to 15, reordered from that of FIG. 5A. Memory sub-channel 515B accesses memory bytes 16 through 31, reordered from that of FIG. 5A. Memory sub-channel 515C accesses byte numbers 32-47, reordered from that of FIG. 5A. Memory sub-channel 515D accesses byte numbering 48-63, reordered from that of FIG. 5A. In this manner, a 64 byte transfer is equally distributed across each of the memory sub-channels while the byte numbers are reordered and assigned.

Referring now back to FIG. 6, the bytes may be reordered differently in other embodiments of the invention.

As discussed previously, to support micro tile memory access, SA shared address bits may be utilized along with I independent address bits while the Q sub-channel select bits and P sub-channel data address bits are utilized to address the physical bytes accessed by a cache-line. For a 64 byte cache-line, the sum of Q sub-channel select bits and P sub-channel data address bits is 6.

In FIG. 6, we indicate the P sub-channel data address bits as being A0-A8. On FIG. 6, the Q sub-channel select bits are labeled A10, A8 and any more there in between. In FIG. 6, the I independent address bits are labeled A9, A10, A16, A18, A24 and any more there in between. In FIG. 6, the SA shared address bits are labeled as A11, A15, A17, A19, A20, A25, A26, and Ax for example. Additional shared address bits may be used in between.

With the I independent address bits, the sub-channel addresses are independent within an address offset of each other. To make the sub-channels fully independent from each other, a complete duplication of the command and address from the memory controller to each sub-channel may be used but would significantly increase the memory controller pin count, the silicon area for input/output drivers, and the wire routing area needed over a host printed circuit board or motherboard. Instead, embodiments of the invention share one or more portions of the sub-channel address bits across all sub-channels and permit the remainder, I, to be independent for each sub-channel, as depicted in FIG. 6. A judicious choice of the I independent address bits can therefore provide increased bandwidth efficiency, balanced against the cost of duplicating I address signals to each sub-channel.

As discussed previously, the I independent address bits may be obtained in different manners including routing additional address lines to each memory sub-channel and/or using address overloading.

Figure 7:
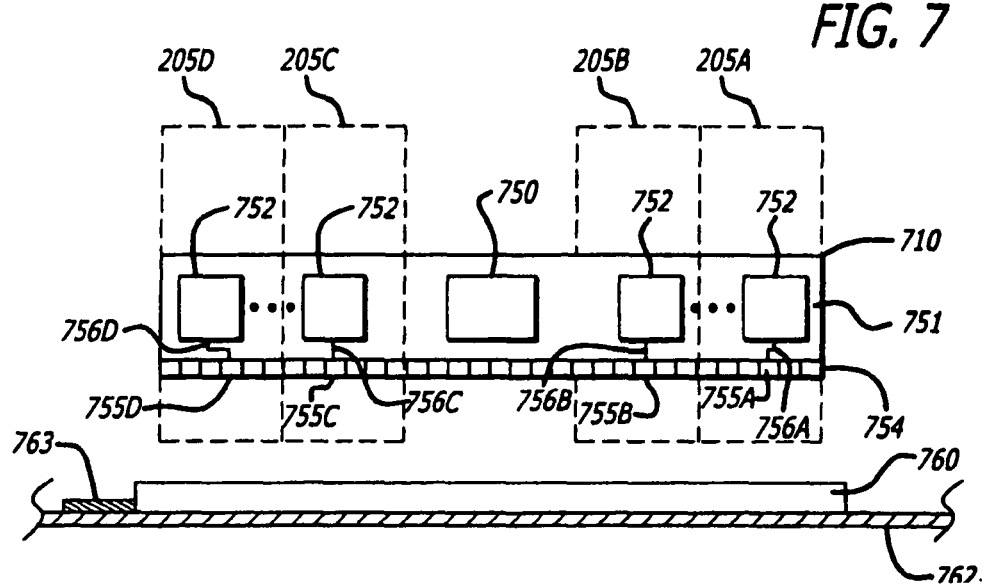
FIG. 7 illustrates a block diagram of a multi-chip memory module to couple to a connector mounted on a host printed circuit board.

Referring now to FIG. 7, a memory module (MM) 710 is illustrated that is exemplary of the memory modules MM1-MMn. The memory module 710 may be of any type such as a single inline memory module (SIMM) or a dual inline memory module (DIMM), for example. The memory module 710 includes memory integrated circuit chips ("memory devices") 752 coupled to a printed circuit board 751. The printed circuit board 751 includes an edge connector or edge connection 754 that couples to an edge connector 760 or other type of connector of a host printed circuit board 762. The edge connector or edge connection 754 of the printed circuit board 751 is formed of a plurality of metal pads that can also be referred to as pins. One metal pad of the edge connection 754 is a VCC or power pad. Another one of the metal pads of the edge connection 754 is a VSS or ground pad. In an alternate embodiment of the invention, the edge connection 754 may be an edge connector with pins instead of metal pads with one pin being a VCC or power pin and another pin being a VSS or ground pin. Collectively, the edge connector and edge connection may be referred to herein as an electrical connector 754 with connectors that may be pins, pads, or a combination of both.

The memory module 710 supports micro-tiling and micro-tile memory accesses. To support micro-tiling of memory, additional address signal lines may be independently supplied to the memory integrated circuits 752 by using the unused or no-connect pins of the pinout of the edge connection 754 of the printed circuit board 751, in one embodiment of the invention. These unused or no-connect pins of the edge connection 754 may be used to route additional independent address signal lines to the memory integrated circuits 752. The same unused pins are found in the corresponding edge connector 760 mounted to the motherboard 762. Additional independent address signal lines 763 are routed across the motherboard 762 to the pre-existing connector from the memory controller in the memory control block to supply the additional independent address information. A number of different types of unused or no-connect pins of the pinout of the edge connection 754 of the memory module may be found.

For example, parity or an error correction code (ECC) function may have pins reserved as part of the pin-out for the edge connection 754. To lower the costs of memory modules to consumers, parity and ECC functions are often left off the memory module so that the reserved signal lines and pins often go unused. That is, the parity/ECC signal lines may be routed into all edge connectors of the motherboard, but are only used when ECC enabled memory modules (e.g., dual inline memory modules (DIM Ms)) are installed therein. The unused pre-existing ECC lines/pins of the memory module are retargeted as independent address signal lines and used to implement micro-tiling in non-ECC memory modules. However in using the ECC lines/pins for micro-tiling, both ECC and micro-tiling functions cannot be enabled at the same time on a memory module. This solution works well in environments that don't typically need (or want) parity/ECC to be enabled.

As another example, optional active low data signal lines that are reserved in the pin-out for the edge connection 754 often go unused as they are redundant of the active high signal lines which are provided. As yet another example, optional test pins reserved within a pin-out for the edge connection 754 of the memory module often go unused as that test mode may not be used.

In any case, these unused pins are retargeted to be independent address signal pins 755A-755D and independent address signal lines 763 are routed on the host printed circuit board 762 and independent address signal lines 756A-756D are routed on the PCB 751 of the memory module 710 to the memory integrated circuits 752.

In some cases, the memory module 710 may further include a support integrated circuit 750 such as a buffer integrated circuit ("buffer") or an error correction control (ECC) integrated circuit. However as discussed previously, if ECC is not provided on the memory module 710, pins of the edge connection 754 that would have been otherwise reserved for ECC and are unused may be used for independent address lines into a memory sub-channel to support micro-tiling.

To support micro-tiling and independent addressing of memory sub-channels, the memory integrated circuits 752 on the memory model 710 may be divided up and assigned to the different memory sub-channels, such as the four memory sub-channels 205A, 205B, 205C, and 205D as illustrated in FIG. 7. The data I/O of a memory integrated circuit 752 is typically 4, 8 or 16 bits wide. For a physical width of sixty-four bits for a memory channel and sixteen bits for each memory sub-channel, four sixteen bit wide memory integrated circuits 752 would be respectively assigned one-to-one to the four memory sub-channels 205A, 205B, 205C, and 205D. Eight eight-bit wide memory integrated circuits 752 would be respectively assigned two at a time to the four memory sub-channels 205A, 205B, 205C, and 205D to provide a physical width of sixty-four bits for a memory channel and sixteen bits each memory sub-channel. Sixteen four-bit wide memory integrated circuits 752 would be respectively assigned four at a time to the four memory sub-channels 205A, 205B, 205C, and 205D to provide a physical width of sixty-four bits for a memory channel and sixteen bits each memory sub-channel.

In the case of two memory sub-channels, four sixteen bit wide memory integrated circuits 752 would be respectively assigned two at a time to the two memory sub-channels for a physical width of sixty-four bits for a memory channel and thirty-two bits for each memory sub-channel. Eight eight-bit wide memory integrated circuits 752 would be respectively assigned four at a time to the two memory sub-channels for a physical width of sixty-four bits for a memory channel and thirty-two bits for each memory sub-channel. Sixteen four-bit wide memory integrated circuits 752 would be respectively assigned eight at a time to the two memory sub-channels for a physical width of sixty-four bits for a memory channel and thirty-two bits for each memory sub-channel.

By using the unused pins of the edge connection 754 of the memory module and a standard edge connector 760, the memory module 710 can be backward compatible with pre-existing memory subsystems.

Consider FIG. 3A for example where four independent memory sub-channels are found in each memory channel. An additional independent four address lines may be provided per sub-channel to independently access an area of memory in each sub-channel. Address lines 311A-311D (labeled A9-A6) are independent within each sub-channel. Given that one set of four address lines pre-exists, the total number of additional address lines that are to be routed is three time four or twelve independent address signal lines. Routing additional signal lines over a motherboard to a memory module may be used to add the independent address signaling when the pinout of a pre-existing edge connector and memory module is not fully utilized.

Figure 8:
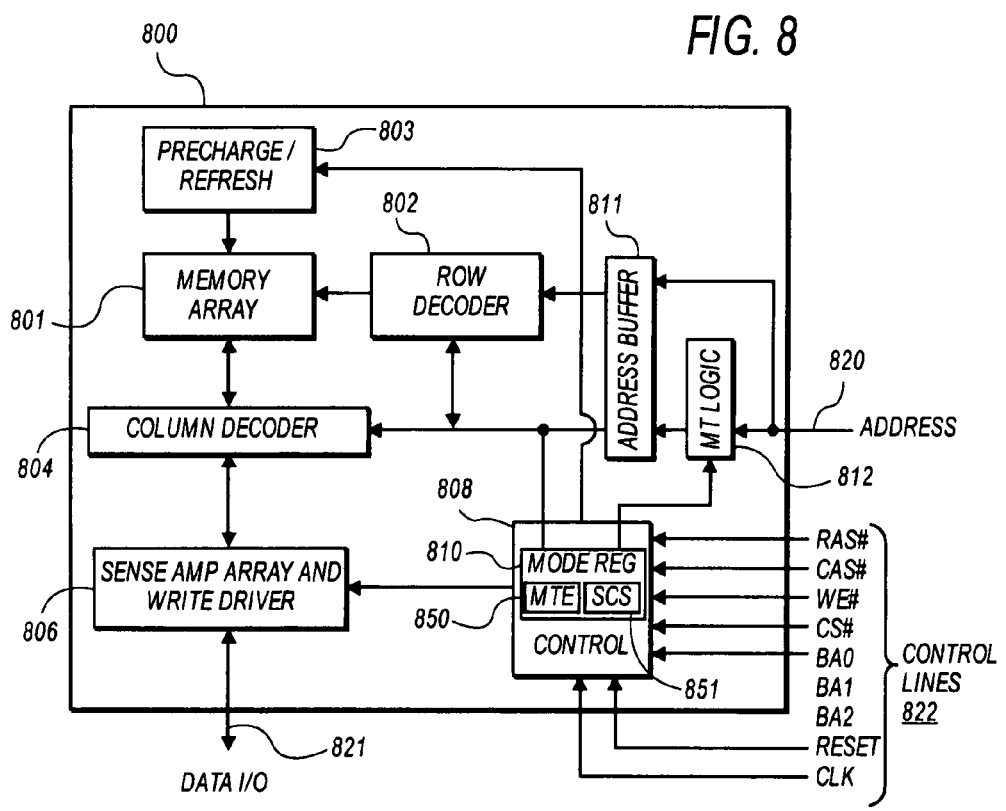
FIG. 8 illustrates a block diagram of a memory integrated circuit to support micro-tile memory accesses over memory sub-channels.

Referring now to FIG. 8, a block diagram of a memory integrated circuit 800 is illustrated. The memory integrated circuit 800 may be included in the memory modules MM1-MMn as the one or more memory devices 752. The memory integrated circuit 800 includes a memory array 801, a row address decoder 802, bitline precharge/refresh logic 803, a column decoder 804, a sense amp array and write driver block 806, a controller 808, an address buffer 811, and micro-tile control logic 812 coupled together as shown. The micro-tile control logic 812 may also be referred to as overload logic (OL).

The controller 808 includes a mode register 810 with a plurality of bits that can be set/initialized to control the general functionality of the memory integrated circuit 800. The mode register includes bit storage circuits to store the bits. The bits of the mode register 810 may be set by applying the appropriate bit settings on address lines 820 or data lines 821 coincident with a load strobe. The load strobe may be generated by toggling one or more of the control lines 822 that are coupled into the controller 808 of the memory integrated circuit when the memory is idle. The controller 808 receives one or more of the control lines 822. The one or more control lines 822 may include row address strobe RAS#, column address strobe CAS#, write enable WE#, chip select CS#, bank selects BA0, BA1, BA2, RESET RST#, clock CLK, and other standard memory integrated control inputs. The control signals on the one or more control lines 822 may be active low signals or active high signals. Active low signals indicate an inverted true condition while active high signals indicate a non-inverted true condition.

More specifically, the mode register 810 may be used to configure the integrated circuit 800 for micro-tile memory access. As will be discussed further below, one of the bits of the mode register 810 is a micro-tile enable bit (MTE) 850. The micro-tile enable bit 850 may be active high and referred to as MTE bit. Alternatively, the micro-tile enable bit 850 may be active low and referred to as MTE#. In either case, the micro-tile enable bit may generally be referred to as the micro-tile enable bit 850 or the MTE bit 850. The micro-tile enable bit 850 is reset by default such that micro-tiling is disabled when the device is initially powered-up or reset. This allows the memory module 710 and the memory integrated circuit 800 to be backward compatible when inserted into systems that do not support micro-tiling. The mode register 810 further has one or more sub-channel select (SCS) bits 851 to indicate the memory sub-channel to which the memory integrated is assigned and addressable. The MTE bit 850 and the one or more SCS bits 851 are coupled into the micro-tile control logic 812.

While a load strobe may be generated by a load mode register command and used to load bit settings into the mode register, a new command may be introduced to read out the bit settings in the mode register from the memory integrated circuit. A status command may be provided to the memory integrated circuit to read out the bits of the mode register. The status command may be formed by uniquely toggling or setting the one or more of the control lines 822 that are coupled into the controller 808 of the memory integrated circuit when the memory is idle. In this case, the MTE bit 850 could be read out from the memory integrated circuits that support micro-tiling.

The micro-tile control logic 812 is coupled to a plurality of address signal lines 820 so as to couple addresses to the column address decoder 804 and/or the row address decoder 802 through the address buffer 811. The address buffer 811 may latch the address signals on the internal address signal lines to hold them for the address decoders. The control logic 812 is also coupled to the mode register of the controller to receive the micro-tile enable bit and at least one sub-channel select bit in order to support micro-tile memory accesses into the memory array 801. In response to the micro-tile enable bit and the at least one sub-channel select bit, the control logic 812 selects one or more of the address signal lines over which to capture independent address information for a predetermined sub-channel to which it is assigned. That is, only a subset of the address signal lines may be assigned to a predetermined sub-channel. The control logic 812 selects this subset of address signal lines to extract the independent address information. Other address signal lines may be used for other sub-channels or some may be shared address signal lines into each sub-channel. The control logic 812 couples the independent address information into the column address decoder 804 and/or the row address decoder 802. The selection of the one or more address signal lines by the control logic may be further responsive to a column address load signal (CAS#) and a transaction enable signal.

Additional control logic may be added into and around the micro-tile control logic 812 in order to further swizzle the independent address information for one significant bit to another significant bit position. This is to provide a somewhat linear addressing method, such as for screen refresh, when micro-tiling is enabled.

The sense amp array and write driver block 806 couples to the data input/output (I/O) bus and may receive control signals from the controller 808 to read data from the memory array or write data into the memory array 801. The sense amp array and write driver block 806 receives data to be written into the memory array 801 and drives data out that has been read from the memory array 801 over the data input/output (I/O) bus 821. The data input/output (I/O) bus 821 includes bidirectional data lines of the memory integrated circuit 800 that are typically 4, 8 or 16 bits wide.

The memory array 801 consists of memory cells that may be organized in rows and columns. The memory cells are typically dynamic random access memory (DRAM) cells but can optionally be a static type of random access memory (SRAM) cell or a non-volatile programmable (NVRAM) type of re-writeable memory cell.

The row address decoder 802 receives a row address on the address lines and generates a signal on one of the word lines (WL) in order to address a row of memory cells in the memory array 801. The column decoder 804 also receives a column address on the address lines and selects which columns within the row of memory cells are to be accessed. The column decoder 804 essentially selects bitlines into memory cells that are to be accessed. In a read access, the column decoder 804 functions as a multiplexer. In a write access, the column decoder 804 functions as a de-multiplexer. The column address decoder 804 selectively accesses columns of memory cells within the memory array 801 in response to shared column address signals and if the micro-tile enable bit within the mode register is set, the column address decoder 804 selectively accesses columns of memory cells within the memory array 801 further in response to independent sub-channel column address signals.

The sense amp array and write driver block 406 may include sense amplifiers to determine whether a logical one or logical zero has been stored within the accessed memory cells during a read operation. The addressed memory cells try to drive a logical one or logical zero onto the selected bitlines of the memory array during the read operation. The sense amplifiers detect whether a logical one or logical zero has been driven out by the addressed memory cells onto the selected bitlines of the memory array during the read operation. The sense amp array and write driver block 406 may further include write drivers to drive a logical one or logical zero onto the selected bitlines of the memory array and into the addressed memory cells during a write operation.

The precharge/refresh block 803 couples to the bitlines in the memory array 801. The precharge/refresh block 803 may precondition the bitlines prior to addressing the memory cells during a read or write operation. The precharge/refresh block 803 may also refresh the data stored in the memory cells of the memory array 801 during periods of inactivity.

During specific memory cycles, some existing signal lines into the memory integrated circuit 800 are not used and can be re-targeted during this time for other purposes. For example during CAS (Column address strobe) cycles, not all the address lines are used. These unused address signal lines can be retargeted during the CAS cycle to communicate additional address information to the memory modules (e.g., DIMMs) and the memory integrated circuit devices therein. The memory controller 208 in the memory control block 202 sends additional address information over these unused address signal lines during the CAS cycle. The memory integrated circuit 800 with the added micro-tile control logic circuitry 812 and bits within the mode register 810 recognizes and decodes these overloaded signals on the previously unused address signal lines that were unused during the CAS cycles.

Figure 9:
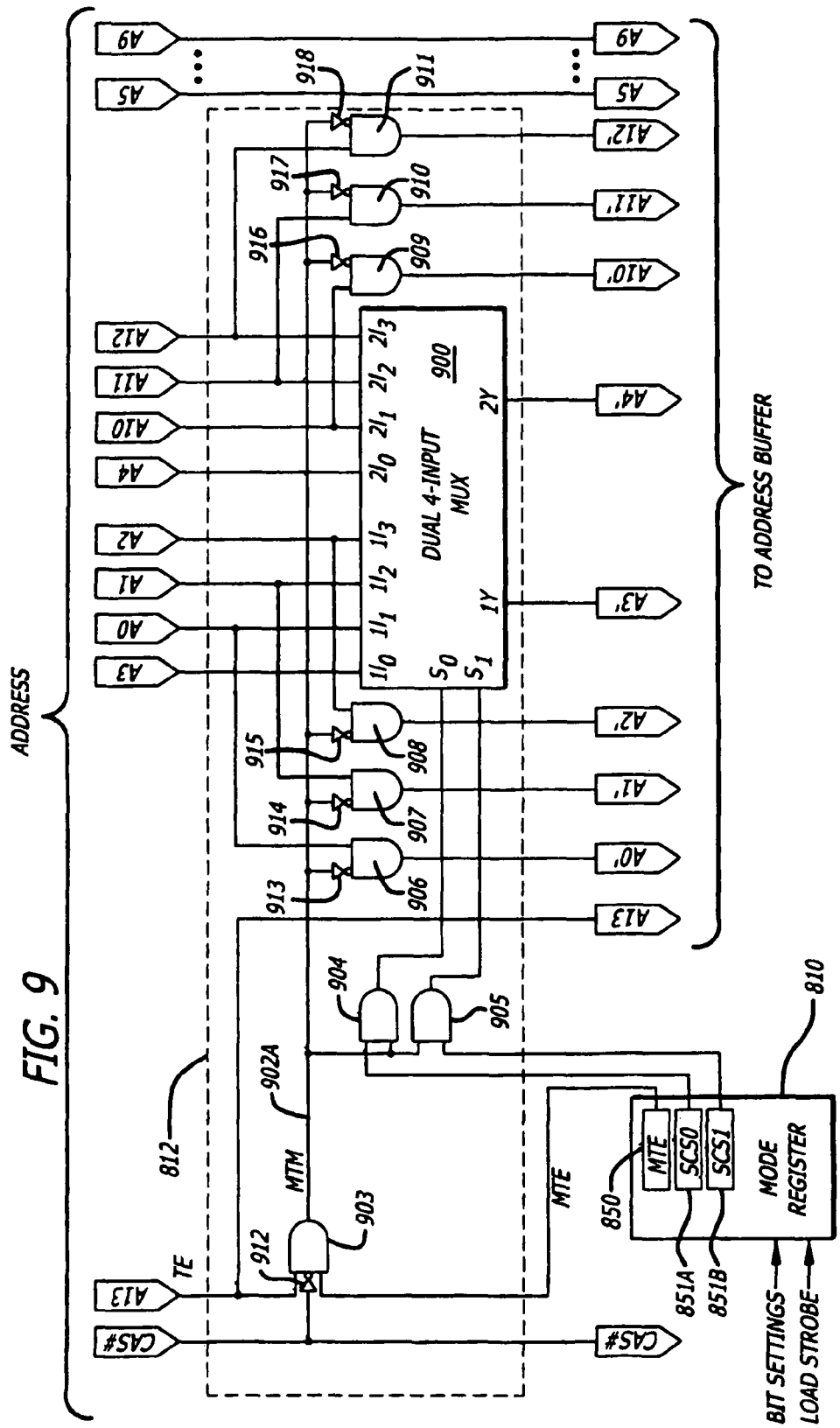
FIG. 9 illustrates a schematic diagram of address overload logic coupled to the mode register for a sixteen bit wide memory sub-channel and a sixteen byte memory access.

Referring now to FIG. 9, to support micro-tiling exemplary micro-tile memory control logic 812A coupled to a mode register 810A within a memory integrated circuit is illustrated. The exemplary implementation of the micro-tile memory control logic 812A decodes overloaded address signal lines that have additional address information provided during unused memory cycles, such as a CAS cycle. The schematic diagram of the micro-tile memory control logic 812A assumes that four sub-channels are provided each of which has a logical width of sixteen bytes to support micro-tiling.

Central to the micro-tile memory control logic 812A is a dual four input multiplexer 900 to capture the independent address information. The dual four input multiplexer 900 of the micro-tile memory control logic 812A selectively outputs shared column address signals or independent sub-channel column address signals on the multiplexed output (A3' and A4'). The outputs (A3' and A4') of the dual four input multiplexer are coupled to the input of the column address decoder. The independent sub-channel column address signals are the one or more independent column address signals that have been selected to be received by the respective memory sub-channel.

The micro-tile control logic 812A receives the address lines from address pins of the memory integrated circuit. The micro-tile control logic 812A provides addresses to the address buffer to be distributed to the row address decoder and the column address decoder. Some of the address pins of the memory integrated circuit receive shared row address signals, shared column address signals, independent column address signals, or a combination thereof. For example, address pins A5-A9 and A13 pass around the micro-tile control logic 812A and may receive shared row address signals and/or shared column address signals into each of the memory sub-channels. Address pins A0-A4 and A10-A12 are coupled into the dual four input multiplexer 900 and may receive shared row address signals and independent column address signals if micro-tiling is enabled. If micro-tiling is not enabled, address pins A3 and A4, coupled into the dual four input multiplexer 900, may receive shared row address signals and/or shared column address signals. A column address load strobe pin CAS# is coupled to the control logic 812A to receive a column address load strobe signal and selectively receive the appropriate one or more of the independent column address signals on the address pins assigned to a given sub-channel for capture inside the memory integrated circuit. The column address load strobe signal may also be used to receive and capture the shared column address signals off of the appropriate address pins.

The mode register 810A may include three bit storage circuits such as a flip flop or memory cell to store settings of a micro-tile enable (MTE) bit, a sub-channel select bit zero (SCS0) bit, and a sub-channel select bit one (SCS1) bit. These three bits in the mode register 810A are programmed with the appropriate sub-channel select bits and micro-tile enable bits. These three bits are set/reset from BIT SETTINGS that the memory integrated circuit receives during initialization such as at power-up or reset. These three bits may also be set/reset when the memory integrated circuit is idle with no memory access in progress. The BIT SETTINGS may be received over the address or data signal lines and loaded into the mode register in response to a LOAD STROBE signal generated by one or more control line inputs coupled into the memory integrated circuit. If micro-tiling is to be enabled in the memory integrated circuit, the micro-tile enable bit MTE is set. As the MTE bit 850 is active high, it is set to a high logic level. If active low, the MTE# bit 850 is set to a logic low level. In the exemplary control logic of FIG. 9, there are possibly four or less sub-channels within a memory channel. The SCS0 and SCS1 bits assign the memory integrated circuit to one of four memory sub-channels. Other memory integrated circuits on the same memory module may be assigned to another one of the four memory sub-channels.

Independent address information for each of the sub-channels is made available over the pre-existing address lines, such as address lines A0-A4 and A10-A12, during the CAS cycle. In this example, address lines A3 and A4 are ordinarily used. Thus, address lines A0, A1, A2, A10, A11, A12, and A13 are overloaded signal lines (A13 may be the micro-tile transaction enable—specified on a transaction basis). This method of overloading signal lines on existing address lines in effect provides six additional address lines (A0-A2 and A10-A12) to the memory integrated circuit devices without the use of additional traces (i.e., wire routing) or the use of additional pins.

The micro-tile memory control logic 812A is provided in each memory integrated circuit so that proper independent sub-channel address information is selected from the address lines A0-A4 and A10-A12 in response to the sub-channel select bits (e.g., SCS0 851A and SCS1 851B) stored in the mode register. The settings of the sub-channel select bits (e.g., SCS0 851A and SCS1 851B) are routed from the mode register 810A to the micro-tile memory control logic 812A to control the input selection process of the multiplexer 900. The output terminals of the multiplexer 900 are coupled to address signal lines A3' and A4'. Address signal lines A3' and A4' are coupled to an address decoder (e.g., column address decoder 804) to select memory cells within the memory array.

The micro-tile control logic may overload the memory address signal lines A3' and A4' during the column address write access time when CAS# is active low ("CAS cycle"). That is, address bits A0, A1, A2, A10, A11 and A12 are normally unused address bits when the column address is being written to the memory integrated circuit without micro-tiling. Address bits A3 and A4, substituted by A3' and A4', are address bits that are used to write the column address to the memory integrated circuit. While address bits are normally unused without micro-tiling during the CAS cycle, they may be used to select the row address in a memory integrated circuit when the row address is being written into the memory integrated circuit when RAS# is active low ("RAS cycle"). This is referred to herein as address overloading. While A0, A1, A2, A10, A11 and A12 are illustrated as being the unused address bits during column address strobe CAS# in FIG. 9, different unused address bits may be utilized as the overloaded address signal lines to support micro-tiling.

The micro-tile memory control logic 812A includes the dual four input multiplexer 900, a three input AND gate 903, a plurality of two input AND gates 904-911, and a plurality of inverters 912-918 coupled together as shown. It is well understood that an AND gate may be formed by the combination of a NAND gate with an inverter having its coupled to the output of the NAND gate.

The dual four-input multiplexer 900 is a pair of four to one multiplexers each having a first select control input S0 coupled together and a second select control input S1 coupled together. The first four to one multiplexer receives inputs 1I0-1I3 and provides the output 1Y in response to the select control inputs S0 and S1. The second four to one multiplexer receives inputs 2I0-2I3 and provides the output 2Y in response to the select control inputs S0 and S1. If S0 and S1 are both logical low or zero, the inputs 1I0 and 2I0 are multiplexed onto the respective outputs 1Y and 2Y. If S0 is a logical high or one and S1 is a logical low or zero, the inputs 1I1 and 2I1 are multiplexed onto the respective outputs 1Y and 2Y. If S0 is a logical low or zero and S1 is a logical high or one, the inputs 1I2 and 2I2 are multiplexed onto the respective outputs 1Y and 2Y. If S0 and S1 are both logical high or one, the inputs 1I3 and 2I3 are multiplexed onto the respective outputs 1Y and 2Y.

The first four-input multiplexer of the dual four-input multiplexer 900 receives the address bits A3, A0, A1, and A2 at its respective 1I0-1I3 inputs and selects one of them to be driven onto the address signal line A3' at its 1Y output. The second four-input multiplexer receives address bits A4 and A10-A12 at its respective 2I0-2I3 inputs and selects one of them to be driven onto the address signal line A4' at its 2Y output. The select control inputs S0 and S1 are respectively coupled to the outputs of the AND gates 904-905.

The AND gate 903 generates a micro-tile mode signal (MTM) 902A at its output. The micro-tile mode signal 902A is active high and generated at the appropriate time when the independent address signals are on the overloaded address signal lines coupled into the dual four-input multiplexer 900. Inverter 912 inverts the active low CAS# signal into an active high CAS signal at its output which is coupled into an input of the AND gate 903. AND gate 903 logically ands the CAS signal, the MTE bit setting (ME), and the transaction enable signal (TE, address bit A13) to generate the micro-tile mode signal 902A. That is if micro-tile is enabled by the MTE bit and the transaction is enabled by the TE signal, the micro-tile mode signal (MTM) 902A is generated when CAS# goes low.

The micro-tile mode signal (MTM) 902A is coupled into the inputs of AND gates 904 and 905 to gate the sub-channel select bits SCS0 851A and SCS1 851B. If the micro-tile mode signal (MTM) 902A is low for any reason, the select controls S0 and S1 into the multiplexer 900 are logically low or zero at the output of the AND gates 904 and 905. With S0 and S1 being both logical low or zero, the address bits A3 and A4 respectively coupled to the inputs 1I0 and 2I0 are respectively multiplexed onto the address signal lines A3' and A4' at the respective outputs 1Y and 2Y. Bits A3 and A4 merely pass through to signal lines A3' and A4' respectively. This is the default condition if micro-tiling is not enabled or if bits A3 and A4 are used for any other purpose, such as row addressing.

When the micro-tile mode signal (MTM) 902A is active high, the sub-channel select bits SCS0 and SCS1 are respectively coupled into the select control inputs S0 and S1 of the multiplexer 900 by passing through the AND gates 904 and 905, respectively. Thus, when the micro-tile mode signal (MTM) 902A is generated to be active high by the AND gate 903, the sub-channel select bits SCS0 and SCS1 control the selection of the multiplexing of the respective four inputs to the respective outputs of the multiplexer 900. Effectively the settings of the sub-channel select bits SCS0 and SCS1, indicating the sub-channel to which the memory IC may be assigned, determines which address bit lines coupled into the multiplexer 900 are used to capture the independent address signals during the CAS cycle.

The settings of the sub-channel select bits SCS0 and SCS1 will vary from one sub-channel to the next. For four sub-channels, there are four different settings for SCS0 and SCS1 respectively. Note however that micro-tile control logic designed to support four sub-channels can be readily reduced to support two sub-channels by using only two different settings of the sub-channel select bits SCS0 and SCS1. With the different settings for SCS0 and SCS1, the multiplexer 900 selects different address signal lines to capture the independent address signals when the micro-tile mode signal is generated.

The micro-tile mode signal (MTM) 902A is also coupled into the inverters 913-918 at a first input to the AND gates 906-911, respectively. The address signals A0, A1, A2, A10, A11, and A12 are respectively coupled into the second input of the AND gates 906-911. The micro-tile mode signal (MTM) 902A effectively gates the signals on the address lines A0, A1, A2, A10, A11, and A12 into the memory integrated circuit respectively at the outputs A0', A1', A2', A10', A11', and A12' of the AND gates 906-911. That is, when the micro-tile mode signal (MTM) 902A is logically low or zero, the AND gates 906-911 allow the signals on address lines A0, A1, A2, A10, A11, and A12 to pass through onto the outputs A0', A1', A2', A10', A11', and A12' and to the address decoders. When the micro-tile mode signal (MTM) 902A is logically high or one, the AND gates 906-911 drive all the outputs A0', A1', A2', A10', A11', and A12' to logical low or zero. Thus when the micro-tile mode signal (MTM) 902A is active high to capture the independent address information, the outputs A0', A1', A2', A10', A11', and A12' are not used as they are all driven to zero.

Loading Identity Values into Memory ICS

Memory integrated circuits may include latches or bit registers to store an identity value. The identity value may be combined with additional functionality to give each memory integrated circuit in a memory channel a unique "personality". The additional functionality may include circuitry that is conditioned by the identity value. The identity value, assigned to each memory integrated circuit in a memory channel and memory module, may be an arbitrary value or a predetermined value. The identity value may be unique to each memory integrated circuit or establish groups of memory integrated circuits having the same identity value.

The identity value may be identity bits hard wired into dedicated pins of a memory integrated circuit. The identity value may be loaded into a number of bits in an existing mode register of a memory integrated circuit, such as found in dynamic random access memory (DRAM) integrated circuits. Alternatively, the identity value may be loaded into a number of bits of a newly defined register. The register to store the identity bits of the identity value can be a write-only register, or the register could be locked after an initial write, or at any time during or after an initialization process.

In micro-tiled memory channels, the identity value of each memory module is the sub-channel to which it is assigned. The identity bits of the identity values are stored in the sub-channel select bits, such as sub-channel select bits SCS0 851A and SCS1 851B, described previously.

The identity value in the memory integrated circuit is programmable outside of the factory. That is, the integrated circuit manufacturer does not load the identity value into the memory integrated circuit at the factory. The identity value is stored or loaded into each memory integrated circuit in various ways outside of the factory, after manufacturing of the memory integrated circuit is completed.

In one embodiment of the invention, the bits of the identify value are set by hard-wiring power or ground into sub-channel select pins of the memory integrated circuits mounted on the memory modules. The memory integrated circuits may receive the identity bit values internally by way of a buffer or alternatively they may be loaded into a register by a load strobe. In another embodiment of the invention, the bits of the identity value are set onto data bit lines of a data bus and are loaded into a register after a predetermined number of clock cycles following reset of the memory integrated circuit. In yet another embodiment of the invention, the bits of the identity value are set onto data bit lines of a data bus and loaded into a register in response to the setting of an enable bit, such as a micro-tile enable bit or a mode enable bit, or other load signal. In still another embodiment of the invention, the bits of the identity value are set onto address bit lines of an address bus and are loaded into a register using a data qualifier to individually program memory integrated circuits, such as dynamic random access memory integrated circuit components.

To set the identity value by hardwiring, wire jumpers are used on a memory module. In this case, each memory integrated circuit includes dedicated identity bit input pins as added input pins to its pinout. The identity bit input pins are tied to a high logic level (a.k.a., a logical one) or a low logic level (a.ka., a logical zero) to set the identity value onto the pins of the integrated circuit. The identity bit values set on the identity input pins may be loaded into the memory integrated circuit in various ways. In micro-tile memory, the identity bit input pins are the sub-channel select input pins S0, S1 to set what subchannel the memory device may be assigned.

Figure 10A:
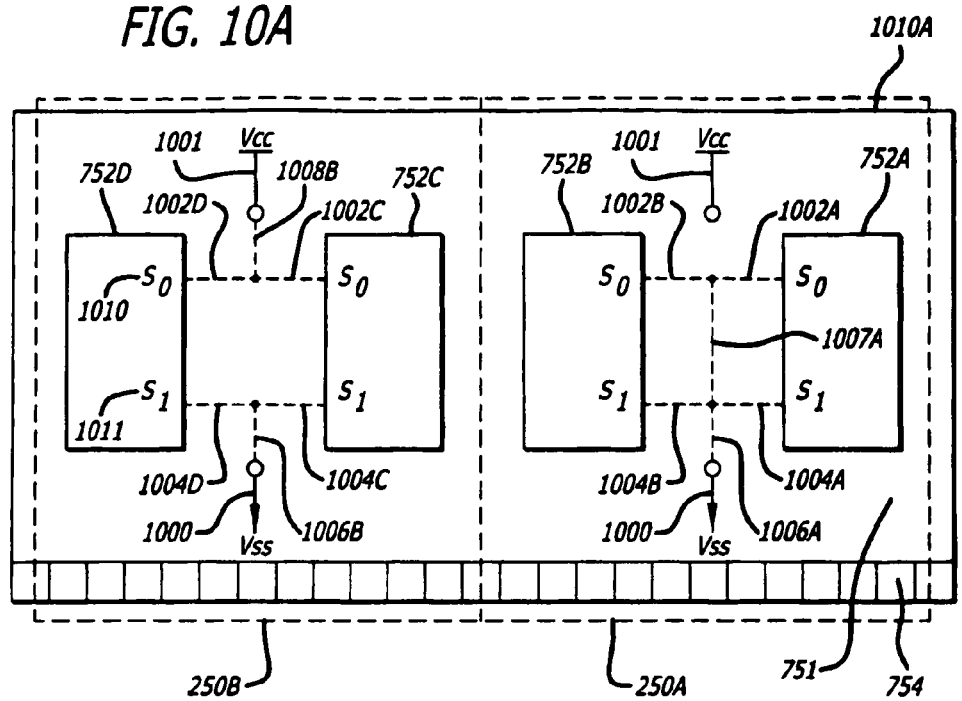
FIG. 10A illustrates a block diagram of a multi-chip memory module and jumper wires configured to assign and identify memory integrated circuits with a pair of subchannels in a memory channel.
Figure 10B:
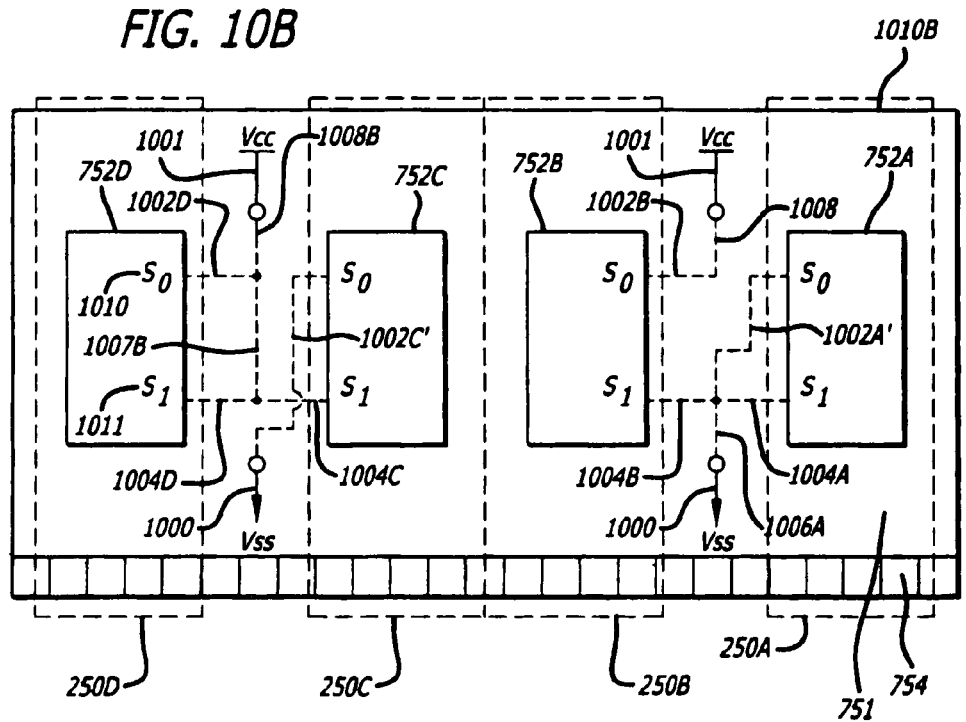
FIG. 10B illustrates a block diagram of a multi-chip memory module and jumper wires configured to assign and identify memory integrated circuits with four subchannels in a memory channel.

Referring now to FIGS. 10A-10C, memory modules 1010A-1010C are illustrated being programmed with identity values by being hard wired to power or ground. FIGS. 10A-10B illustrate memory modules 1010A-1010B respectively using jumper wires to selectively couple power or ground into the sub-channel select input pins S0, S1 (a.k.a., identity input pins) of each memory integrated circuit. In FIG. 10C, packaged switches mounted to the memory module 1010C selectively couple power or ground into the sub-channel select input pins S0, S1 (a.k.a., identity input pins) of each memory integrated circuit.

Setting a value of logic 0,0 on the identity input pins S1,S0 respectively represents an identity value of zero. Setting the identity input pins S1,S0 to logic 0,1 respectively represents an identity value of one. Setting the identity input pins S1,S0 to logic 1,0 respectively represents an identity value of two. Setting the identity input pins S1,S0 to logic 1,1 respectively represents an identity value of three. While a pair of identity input pins have been illustrated and described, additional dedicated identity input pins can be provided to each memory integrated circuit to enable the use of a larger range of differing identity values.

In FIG. 10A, memory module 10101A includes memory integrated circuits 752A-752D coupled to a printed circuit board 751. The memory integrated circuits 752A-752D are electrically coupled to the pads forming the edge connection 754 of the printed circuit board 751. Memory module 1010A is programmed so that its memory integrated circuits 752A-752D are assigned to two memory sub-channels 250A-250B. The identity values are programmed into the memory integrated circuits by using jumper wires 1002A-1002D, 1004A-

1004D, 1006A-1006B, 1007A, and 1008B coupling the identity input pins S0,S1 to either power (VCC) 1001 or ground (VSS) 1000 as illustrated. The bits set on the identity input pins S0,S1 may be referred to as identity bits S0,S1. The identity bits S0,S1 represent the arbitrary identity values that may be loaded or programmed into a register with one or more flip-flops or one or more latches in each memory integrated circuit.

Each of the memory integrated circuits 752A-752D may have at least two extra pins, identity input pins S0 1010 and S1 1011. The identity values are stored by setting the input pins S0 1010 and S1 1011 to either power (VCC) 1001 or to ground (VSS) 1000.

In FIG. 10A, the identity input pins S0, S1 of memory integrated circuits 752A-752B are both set to zero or by the jumper wires 1002A-1002B, 1004A-1004B, 1006A, and 1007A. The center jumper wire 1007A couples the identity input pins S0 and S1 together. This programs memory integrated circuits 752A-752B of the memory module to be assigned to a first memory sub-channel 250A, sub-channel 0.

Memory integrated circuits 752C-752D in FIG. 10A have their identity input pins S1 set to zero by being coupled to ground (VSS) 1000 and have their identity input pins S0 set to one by being coupled to power (VCC) 1001. The identity input pins S1 of the memory integrated circuits 752C-752D are coupled to ground through jumper wires 1004C, 1004D, and 1006B coupled to ground (VSS) 1000. The identity input pins S0 of the memory integrated circuits 752C-752D are set to one by the jumper wires 1002C-1002D and 1008V coupled to power (VCC) 1001. This programs memory integrated circuits 752C-752D of the memory module to be assigned to a second memory sub-channel 250B, sub-channel 1.

In this manner, memory integrated circuit devices 752A-752B have their identity input pins S0, S1 both tied low to VSS or ground to set them to a logic 0,0, respectively, or an Identity Value of 0. Memory integrated circuit devices 752C-752D have their identity input pins S0, S1 set to logic 0,1, respectively, or an Identity Value 1.

In FIG. 10B, the memory integrated circuits 752A-752D of the memory module 10101B are assigned through their identity values to four memory sub-channels 250A-250D.

Memory integrated circuit 752A has its identity value set to zero by having both of its identity input pins S1 and S0 set to zero by being coupled to ground (VSS) 1000. The S0 and S1 identity input pins of the memory integrated circuit 752A are coupled to ground (VSS) 1000 through the jumper wires 1002A', 1004A, and 1006A. This programs the memory integrated circuit 752A of the memory module to be assigned to a first memory sub-channel 250A, sub-channel 0.

Memory integrated circuit 752B has its identity value set to one. The identity input pin S0, coupled into the memory integrated circuit 752B, is set to logical one through the jumper wires 1002B and 1002A coupling to power (VCC) 1001. The identity input pin S1 of memory integrated circuit 752B is set to zero by being coupled to ground (VSS) 1000 through the jumper wires 1004B and 1006. This programs the memory integrated circuit 752B of the memory module to be assigned to a second memory sub-channel 250B, sub-channel 1.

Memory integrated circuit 752C has its identity value set to two. That is, the memory integrated circuit 752C is assigned to sub-channel two of four sub-channels by having its identity input pin S1 set to one and its identity input pin S0 set to zero. The identity input pin S1 of memory integrated circuit 752C is set to one by jumper wires 1004C, 1007B, and 1008B coupling to power (VCC) 1001. The identity input pin S0 of memory integrated circuit 752C is set to zero by being coupled to ground (VSS) 1000 through the jumper wire 1002C' which may include one or more vias to cross under or over jumper wire 1004C. This programs the memory integrated circuit 752C of the memory module to be assigned to a third memory sub-channel 250C, sub-channel 2.

Memory integrated circuit 752D has its identity value set to three to indicate program it to belong to a fourth memory sub-channel, sub-channel 250D. Both S1 and S0 identity input pins of the memory integrated circuit 752D are set to one by being coupled to power (VCC) 1001. The identity input pin S1 of integrated circuit 752D couples to power by means of jumper wires 1004D, 1007B, and 1008B. The identity input pin S0 of the integrated circuit 752D couples to power through the jumper wires 1002D and 1008B.

FIGS. 10A-10B illustrate how jumper wires may be used to program the identity values into the memory integrated circuits 752A-752D of a memory nodule. However, other means may be used to hardwire the logic levels of the identity input pins S1 and S0 of the memory integrated circuits. FIG. 10C illustrates an alternative method over that of using jumper wires.

Referring now to 10C, memory module 1010C is illustrated utilizing dip switches 1020A-1020B to set the identity values onto the identity input pins of the integrated circuits, instead of using jumper wires. Memory model 1010C includes memory integrated circuits 752A, 752B coupled to the dip switch 1020A. Memory module 1010C further includes memory integrated circuits 752C and 752D coupled to dip switch 1020A. Each of the dip switches 1020A and 1020B couple to power (VCC) 1001 and ground (VSS) 1000 in order to set the identity input pins S1 and S0 to a logical one or zero for each of the memory integrated circuits 752A-752D.

The dip switches 1020A-1020B couple to the identity input pins S0 and S1 of each memory integrated circuit independently. For example, the identity input pin S1 of integrated circuit 752A is coupled to and switched independently by the dip switch 1020A from the identity input pin S1 of integrated circuit 752B. As another example, the dip switch 1020B is coupled to integrated circuit 752C independently from its coupling to integrated circuit 752D.

Dip switch 1020A couples to the identity input pins S0 and S1 of memory integrated circuit 752A and the identity input pins S1 and S0 of memory integrated circuit 752B. Dip switch 1020B couples to the identity input pins S1 and S0 of memory integrated circuit 752C and the identity input pins S1 and S0 of integrated circuit 752D.

Each of the dip switches 1020A and 1020B may be a single pole double throw switch. The single pole couples to the respective S1 or S0 input while the throws couple to power and ground. Each dip switch 1020A-1020B includes four single pole double throw switches, one for each identity value input to the memory integrated circuits.

While a pair of identity input bits and pins have described, additional identity bits and pins can be provided to each memory integrated circuit to enable a larger range of differing identity values. While dip-switches 1020A-1020B provide a switching means to set the identity input pins and identity values, any other switch means may be used.

Figure 11A:
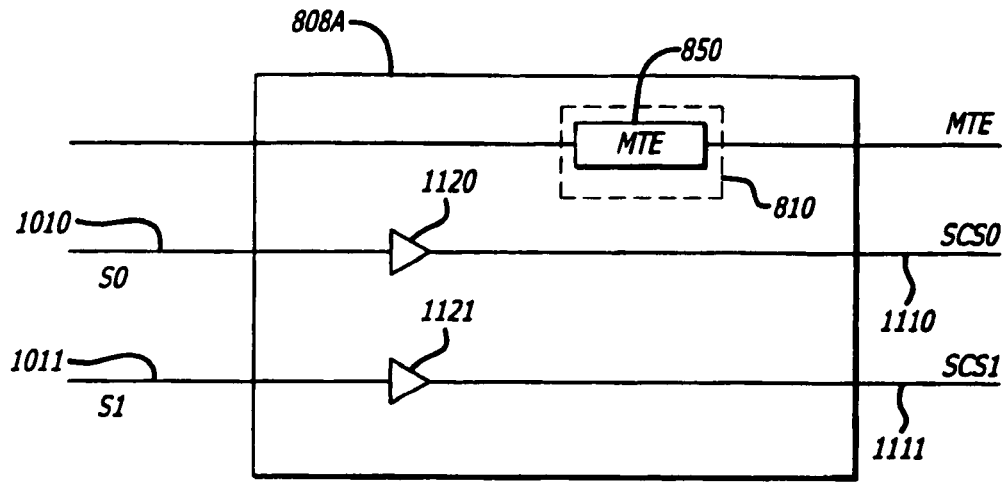
FIG. 11A illustrates a block diagram of control circuitry including a buffer to receive the identity bits from the identity pins for the hard-wire settings of FIGS. 10A-10C.

Referring now to FIG. 11A, with the dedicated identity input pins being hardwired to power or ground as illustrated in FIGS. 10A-10C, the identity input bits and the identity value can simply be received by a buffer in the memory integrated circuit. Control logic 808A includes buffers 1120-1121 to receive the identity bit values set on the identity input pins S0 1010 and S1 1011. The buffers 1120 and 1121 respectively generate the identity bits SCS0 1110 and SCS1 1111 in response to the hardwire setting on the identity input pins S0 1010 and S1 1011. In this manner, the register 810 is bypassed and the identity value on the dedicated input pins may be used directly in the functionality of the memory integrated circuit. Note that the buffers 1120, 1121 may be inverting input buffers or non-inverting input buffers.

The micro tile enable bit may be loaded or programmed into a bit storage circuit 850 of a register, such as the mode register 810 or an extended mode register, of a memory integrated circuit 752 using standard, well known register programming techniques. For example the bit storage circuit may be part of a register that can be accessed in a memory mapped space or an I/O mapped space on the memory integrated circuit. The bit storage circuit 850 may be a latch or a flip-flop with a data input. The bit storage circuit 850 is then appropriately clocked or strobed coincidentally when the micro-tile enable bit is set at its data input to load it therein. While FIGS. 10A-10C illustrate a method of setting identity values by hardwire means, the identity bit values may be logically loaded into one or more identity registers upon reset or an initialization of the memory integrated circuits 752A-752D.

Figure 11B:
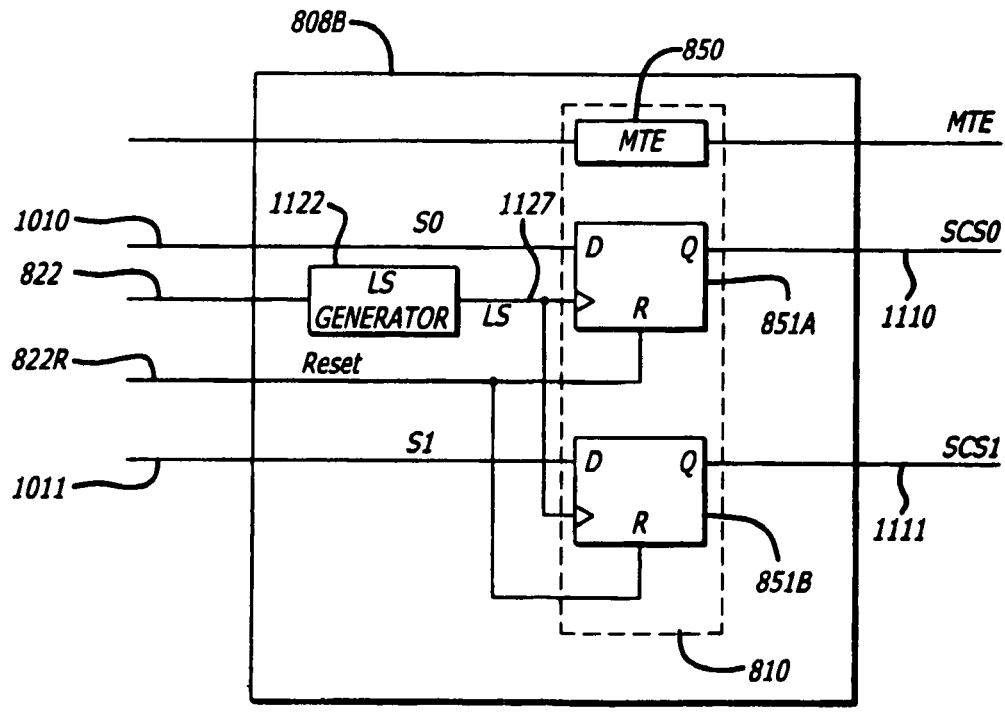
FIG. 11B illustrates a block diagram of control circuitry including a register to receive the identity bits from the identity pins for the hard-wire settings of FIGS. 10A-10C.

Referring now to FIG. 11B, the identity value set by the dedicated identity input pins being hardwired to power or ground, as is illustrated in FIGS. 10A-10C, can also be loaded into bit storage circuits (e.g., bit registers or latches) within the memory integrated circuits. In FIG. 1B, control logic 808B includes a register 810 with bit storage circuits (e.g., bit registers or latches) 851A-851B having their data inputs D coupled to the identity input pins S0 1010 and S1 1011 to receive the respective setting of the identity bits and identity value. The clock inputs of the bit storage circuits (e.g., bit registers or latches) 851A-851B are coupled to a load strobe output signal LS 1127 of a load strobe generator 1122. The resent inputs of the bit storage circuits (e.g., bit registers or latches) 851A-851B are coupled to the reset control signal 822R. The bit storage circuit 850 for the micro-tile enable bit may be loaded similarly as part of the register 810 or loaded differently if part of a different register.

Figure 11C:
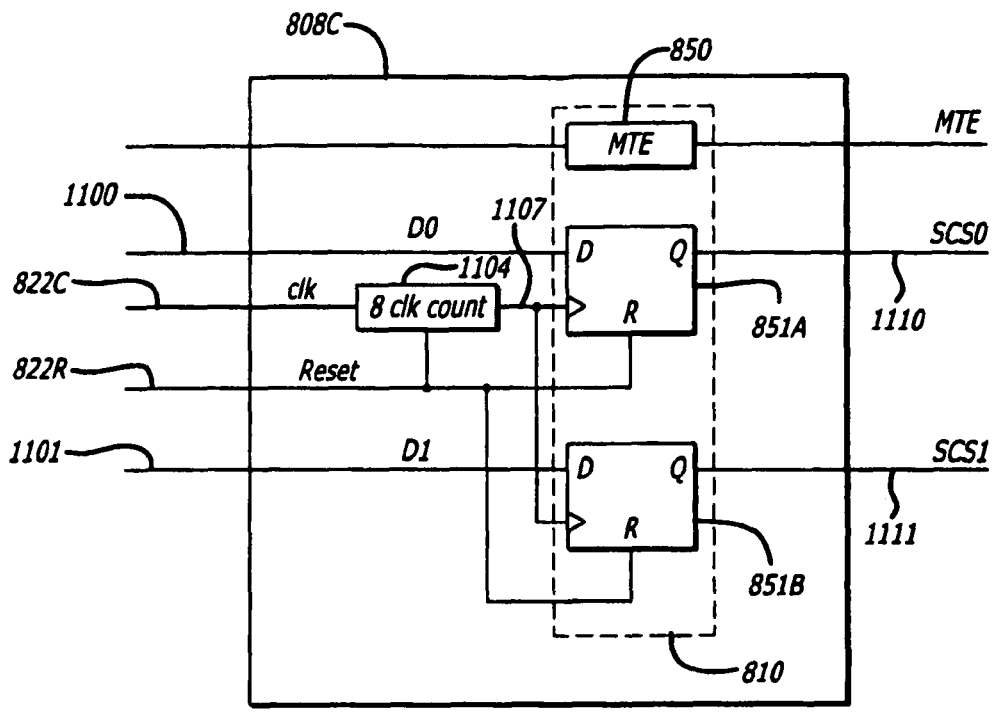
FIG. 11C illustrates a block diagram of control circuitry including a register to capture identity information after a specific number of clock cycles out of reset.
Figure 11D:
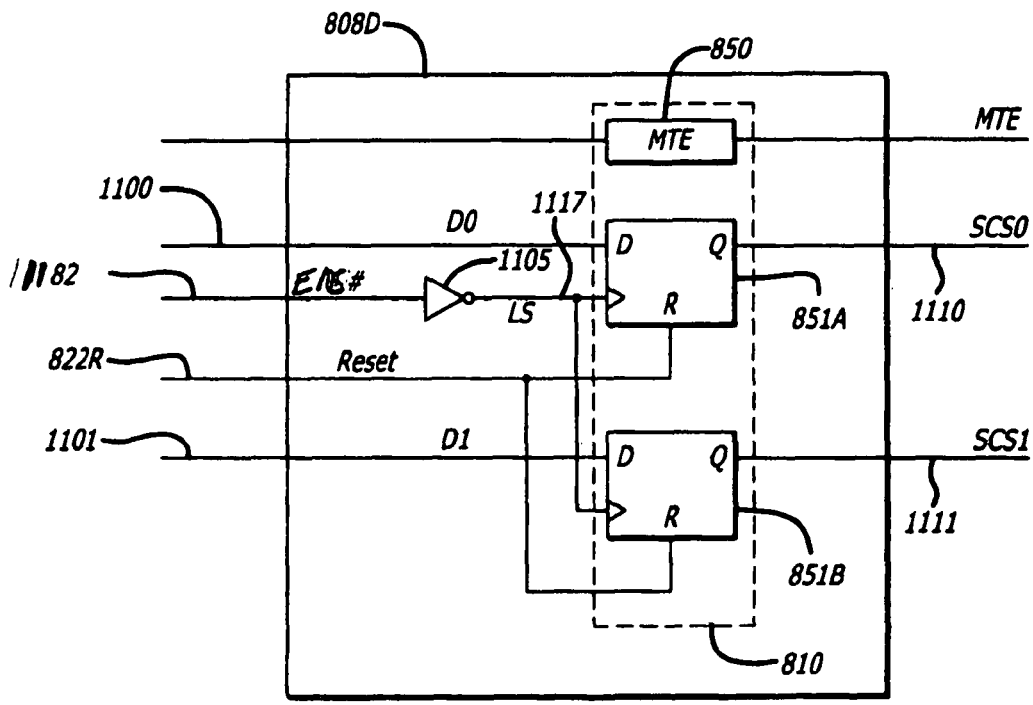
FIG. 11D illustrates a block diagram of control circuitry including a register to capture identity information coincident with a strobe of a control signal after reset.

The load strobe generator 1122 has its input coupled to one or more of the control signals 822 in order to generate the load strobe output signal LS 1127. The load strobe generator 1122 can generate the load strobe output signal LS 1127 in a variety of ways in response to one or more pulses of the one or more control signals 822. Because the identity input pins S0 1010 and S1 1011 are hardwired and substantially fixed after power up, the timing of one or more pulses of the one or more control signals 822 can be substantially relaxed to generate the load strobe output signal LS 1127. FIGS. 11C-11D, discussed further below, further describe generation of load signals 1107, 1117 that may be used as the load signal LS 1127.

Referring now to FIG. 11C, a logical means of programming individual memory devices of the memory modules is now described. This method of programming individual memory devices uses the reset signal 822R and a clock signal 822C to load identity values from data bits of the data bus into the identity bit storage circuits SCS0 851A and SCS1 851B.

FIG. 1C illustrates a control logic 808C of a memory integrated circuit 752 including an SCS0 bit storage circuit 851A and an SCS1 bit storage circuit 851B as part of a mode register 810. The bit storage circuit 850 for the micro-tile enable bit may be part of the mode register 810 as well. The bit storage circuits 850,851A,851B may be D flip flops. Data bit input pin D0 1000 of a data bus is coupled into the data input D of the D flip-flop 851A. Data bit input pin D1 1101 of a data bus is coupled into the data input D of the D flip-flop 851B.

The Q outputs of the D flip-flops 851A-851B are respectively coupled to the identity bits (a.k.a., sub-channel select bits) SCS0 1110 and SCS1 1111.

The control logic 808C further includes a counter 1104 to count a determined number of clock cycles following de-assertion of the reset control signal 822R from which to load the D flip-flops 851A and 851B with the identity bit settings off of the data bit input pins D0 1100 and D1 1101 of the data bus. In one embodiment of the invention, the counter 1104 is an eight clock cycle counter to count eight clock cycles after reset to generate the load signal. Coupled into the counter 1104 is a clock signal 822C and a reset control signal 822R. The reset control signal 822R is also coupled into the reset inputs R of the D flip-flops 851A-851B. The output of the counter 1104 is coupled into the clock input of the D flip-flops 851A-851B such that when the counter 1104 reaches a pre-determined value, it generates a pulse in a load signal 1107 to trigger the D flip-flops 851A and 851B to load the identity value settings. That is, a pre-determined number of clocks after reset is de-asserted, the identity value is loaded from the data bit lines of a data bus into a register of the memory integrated circuit. After the pulse of the load signal 1107 has been generated, the clock counter 1104 continues to be clocked but rolls over and stops counting, until the reset control signal 822R is asserted once again to reset the counter 1104. The bit storage circuit 850 for the micro-tile enable bit may be loaded similarly as part of the register 810 or loaded differently if part of a different register.

FIG. 13A illustrates an exemplary wave form diagram of the functionality of the control logic 808C of FIG. 1C. A reset wave form 1300, a clock wave form 1301, a D1/D0 data bit wave form 1302A, and an SCS1/SCS0 wave form 1303A are illustrated in FIG. 13A. After the reset pulse 1304 in waveform 1300 is de-asserted, there is a predetermined number of clock cycles 1305 in waveform 1301 that occur before the setting on data bit input pins D0/D1 of the data bus are loaded into a register to store the identity value. During the last clock cycle 1308 of the clock signal 822C, the identity bit settings on the data bit input pins D1 and D0 are ready to be loaded into the integrated circuit at point 1307 on the wave form 1302A.

At point 1301A on the clock wave form 1301, the identity bit settings on the data bit input pins D1 and D0 may be loaded into the bit storage circuits, in response to the rising edge 1306 of a clock count signal CCNT 1107 illustrated by wave form 1303. The clock count signal CCNT 1107 may also be referred to as a load signal 1107 as it loads the identity bits into a bit storage circuit in the memory integrated circuit. Assuming the bit storage circuits are negative edge triggered D flip-flops, the output Q of the D flip-flop changes state on the falling edge of the clock count signal CCNT 1107, during the last clock cycle 1308 of the counter 1104, prior to the counter rolling over. Depending upon the identity bit settings, the Q outputs of the D flip-flops may change state from its reset state as illustrated at point 1309 on the wave form 1304A to store the identity bit values.

In this example, eight clock cycles after the reset pulse 1314 is de-asserted, the identity value for each memory device is loaded from its D0 and D1 data input pins coupled to bits of a data bus. Because each memory device has a separate set of data input pins to couple to bits of a data bus, the identity value of each memory device can be loaded with an arbitrary value that may be unique from all others. As illustrated in FIGS. 12A-12B, the memory integrated circuits may be aligned with bytes of the width of a memory channel.

A memory controller drives the desired identity value setting for each memory integrated circuit onto the data bits of each byte data field aligned with the memory integrated circuits. The memory controller drives the desired identity value settings onto the data bits in each byte of the 64-bit data field prior the clock count CCNT value reaching a predetermined number of clock cycles after reset. In one embodiment of the invention, eight clock cycles after reset, the identity bit values are latched into an identity value field of some a register in each memory integrated circuit device.

Referring now to FIG. 12A, a memory module 1210A is illustrated including eight memory integrated circuit devices 752A-752H (Mem Dev A-Mem Dev H) coupled to an edge connector 754. Each of the memory integrated circuits 752A-752H has a number of data input/output pins that couple to the data bits and data bus of the memory module and memory channel. That is, the memory integrated circuits 752A-752H are 8 bits wide (a.k.a., by 8 or x8) having 8 data pins that couple to eight different data bits of the 64 bit data bus 1200 at the edge connector 754. Integrated circuits 752A-752H respectively couple to the eight bit data bytes 1202A-1202H in FIG. 12A. Data bits on input/output pins D0 and DI of each memory integrated circuit are respectively illustrated coupling between the edge connector 754 and the memory integrated circuits 752A-752H. Data bit input/output pins D0 are labeled 1101A-1100H for each respective eight bits of data 1202A-1202H. Data bit input/output pins D1 1101A-1100H are respectively illustrated coupling to the eight bit data bytes 1202A-1202H of the 64 bit data bus 1200.

With each memory integrated circuit 752A-752H coupling to respective D0 and D1 bits 1100 and 1101, the identity value may be loaded off of the data bus when the clock counter 1104 reaches its predetermined clock cycle count following reset.

Referring now to FIG. 12B, a memory module 12 10B is illustrated including four memory integrated circuit devices 752A'-752D' (Mem Dev A-Mem Dev D) coupled to the edge connector 754. The four memory integrated circuit devices 752A'-752D' differ from the eight memory integrated circuit devices 752A-752H in that the memory integrated circuit devices 752A'-752D' are wider. The memory integrated circuit devices 752A'-752D' are 16 bits wide (a.k.a., by 16 or x16) having 16 data pins that couple to sixteen different data bits of the 64 bit data bus 1200 at the edge connector 754. The data bits into and out from each of the memory integrated circuits 752A-752D is 16 bits wide so that only four integrated circuits may be used to couple to a 64 bit data bus 1200.

Memory integrated circuit 752A' couples to the first and second 8 bit data bytes 1202A and 1202B of the data bus 1200. Memory integrated circuit 752' couples the third and fourth 8 bit data bytes 1202C and 1202D. Memory integrated circuit 752C' couples to fifth and sixth 8 bit data byes 1202E and 1202F. Memory integrated circuit 752D' couples to the seventh and eighth 8 bit data bytes 1202G and 1202H.

While the width of the data bus, the physical memory channel width, from the memory controller to the memory modules has been described as being 64 bits wide, other physical bit widths may be used for the data bus.

Previously, a clock signal was used to trigger the loading of the identity bits into the memory integrated circuit. However, other data strobes could also be used to trigger the loading of the identity bits into a memory integrated circuit. For example, a logically generated data strobe signal is an extended mode register strobe signal EMS# that is generated when a memory integrated circuit is sent in a programming mode to have bits of an extended mode register programmed by a combination of control signals. The extended mode register strobe signal EMS# may be used to trigger the loading of the identity bits into the memory integrated circuit.

Referring now to FIG. 11D, a block diagram of control logic 808D of a memory integrated circuit 752 is illustrated. The control logic 808D may use the extended mode register strobe signal EMS#, a data strobe, as the trigger to load the identity bits into the memory integrated circuit. EMS# is an active low signal and it is assumed that negative edge triggered D-flop flops may be used. Thus, when EMS# is asserted, the values on the data bus may be read into bit storage circuits such as latches or a register, such as an identity value register or sub-channel select register. When EMS# is de-asserted, the identity bit values are stored or latched into the bit storage circuits for internal use by the memory integrated circuits and the identity bit values set on the data input pins can then change.

The control logic 808D includes an SCS0 bit storage circuit 851A and an SCS1 bit storage circuit 851B as part of a mode register 810. The MTE bit storage circuit 850 for the micro-tile enable bit may be part of the mode register 810 as well. The bit storage circuits may be latches or D-type flip flops to store a bit of data. Data bit input pin D0 1100 from is coupled into the D input of the D flip-flop 851A. Data bit input pin D1 1101 is coupled into the D input of the D flip-flop 851D.

The control logic 808D further includes a buffer 1105 coupled into the clock inputs of the D flip-flops 851A-851B. The buffer 1105 may be an inverter buffer formed out of a single inverter or an odd series of inverters. Alternatively, the buffer 1105 may be a non-inverting buffer which may simply be formed out of an even series of inverters. In any case, the buffer 1105 receives a control signal or data strobe signal, such as the extended mode register strobe signal EMS# 1182, and generates a load signal 1117.

The EMS# signal 1182 is coupled into the input of the buffer 1105. The EMS# signal 1182 is an active low signal which may then be inverted by an inverting buffer 1105 into the load signal 1117 and coupled into the clock inputs of the D flip-flops 851A-851B. The load signal 1117 is utilized to load the identity bits into the D flip-flops 851A-851B from the data bit input pins D1/D0. The bit storage circuit 850 for the micro-tile enable bit may be loaded similarly as part of the register 810 or loaded differently if part of a different register. Otherwise the control logic 808D is similar to the control logic 808C illustrated in FIG. 11C and previously described.

EMS# signal 1182 may go active low and cause the generation of the load signal 1117 some predetermined number of clock cycles following reset, after the reset strobe 822R goes away. By knowing when the EMS# signal 1182 may go active low, the identity bit values can be set onto the data bit input pins D0 1100 and D1 1101 with sufficient set up and hold times.

Referring now to FIG. 13B, an exemplary wave form diagram is provided to illustrate the exemplary functionality of the control logic 808D of FIG. 11D. A reset wave form 1300, a data strobe/load signal LS/EMS# wave form 1310, a D1/D0 data bit wave form 1302B, and an SCS1/SCS0 wave form 1303B are illustrated in FIG. 13B. The reset wave form 1300 is for the reset control input 822R. The data strobe/load signal LS/EMS# wave form 1310 represents the load signal 1117 or the EMS# strobe signal 1182. An active low wave form for EMS# or any other strobe signal may be inverted from that of the wave form 1310. The D1/D0 data bit wave form 1302B illustrates the identity input bits D1/D0 1101,1100. The SCS1/SCS0 wave form 1304B illustrates the values of the identity bits SCS1/SCS0 1111,1110 loaded into the D flip-flops 851A-851B.

After the reset pulse 1314 of the reset control signal 822R goes away, a predetermined time period 1325 may lapse before the data strobe EMS# signal 1182 is asserted. Before the predetermined time period 1325 lapses, the identity bits may be set onto the data bit input pins D1/D0 to provide sufficient set up time so that they can be received into the memory integrated circuit and coupled into the bit storage circuits. The load signal 1117 loads the identity bits set onto the data input pins D1/D0 of the memory integrated circuit into bit storage circuits 851A,851B of the register 810 therein. The bit storage circuits may be D flip-flops, latches or other type of bit storage circuit.

Assuming negative edge triggered D type flip-flops are used as the bit storage circuits, the rising edge 1327 of the pulse 1326 of the load signal waveform 1310 reads the identity bit values on the respective data bit input pins D1 and D0 into the D flip-flops 851A-8511B. The pulse 1326 of the load signal waveform 1310 may have a pulse width 1335 that is a function of a predetermined number of clock cycles or a predetermined time period. Upon the negative going edge 1328 of the pulse 1326, the load strobe signal 1117 latches the identity values into the D flip-flops 851A-851B and may generate the rising edge 1329 in waveform 1304B of the SCS1/SCS0 bits 1111, 1110. In this manner the load signal 1117 generated by the extended mode register strobe signal EMS# 1182 may load the identity values into the integrated circuit 752.

While the extended mode register strobe signal EMS# has been described as being used to trigger the loading of the identity bits into the memory integrated circuit, other data strobe signals generated by the control signals 822 may be used.

Described previously, the data bus of the memory channel coupling between the edge connector and the memory integrated circuit devices 752 was utilized to load the identity values into the memory integrated circuits using a data strobe signal. However with the memory integrated circuits in a non-data access mode, such as a program mode or a setup mode, the address bit lines of the memory channel may also be used to program identity values into the memory integrated circuits on the memory modules. In this case, the data strobe to load the identity bits on the address bit lines into the memory integrated circuit may be provided on the data bus or other data bus related signal lines.

Figure 14:
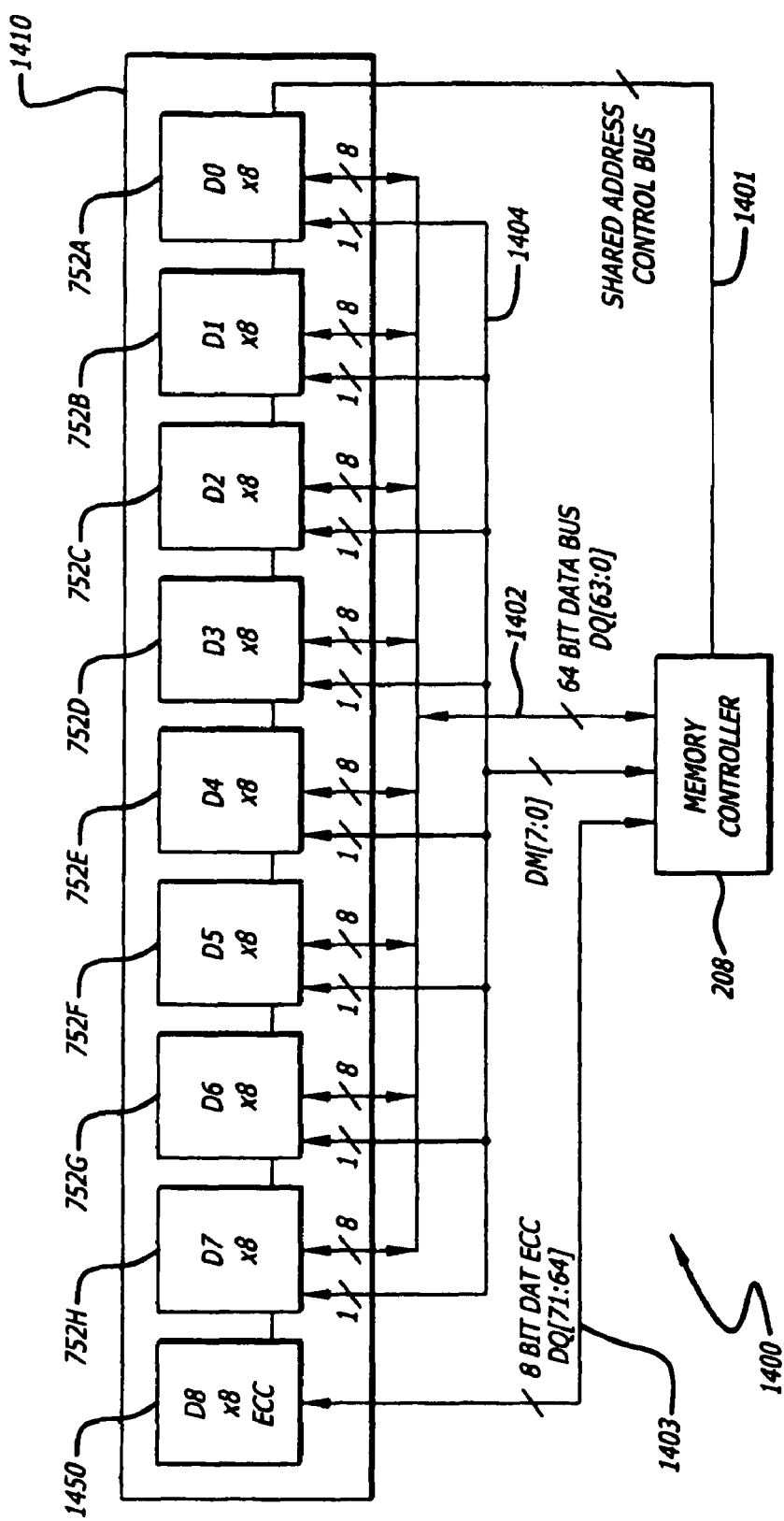
FIG. 14 is a block diagram of a memory controller coupled to a memory module to illustrate an exemplary method of loading identity values into a register in response to a data qualifier on a data bus.

Referring now to FIG. 14, an exemplary bus structure 1400 is coupled between a memory controller 208 and a memory module 1410. The exemplary bus structure 1400 includes a shared address & control bus 1401, a data bus (DQ[63:0]) 1402, an ECC data bus (DQ[71:64]) 1403, and a data mask bus (DM[7:0]) 1404. The data (DQ) bits of the data bus 1402 are typically used to transfer data during a memory access between the memory module 1410 and the memory controller 208. The data mask (DM) bits of the data mask bus 1404 are typically used to mask out the transfer of an 8-bit byte of data between a memory integrated circuit 752 and the memory controller 208. In the case of 4-bit and 8-bit wide memory integrated circuits, the data mask (DM) bits may be coupled to chip select control signals. In the case of memory integrated circuits that are 16-bit wide or of greater width, more that one data mask (DM) bit may be coupled into each memory integrated circuit.

The memory module 1410 includes the memory integrated circuits 752A-752H (D0×8-D7×8) and an ECC chip 1450 (D8×8ECC) mounted to a printed circuit board. The memory module 1410 couples to the exemplary bus structure 1400 of a host motherboard through its edge connection 754 (shown in 7, 10A-10C).

As discussed previously, the address bit lines of the memory channel may also be used to program identity values into the memory integrated circuits on the memory modules. However, all of the address bits of the shared address & control bus 1401 may be coupled into each of the memory integrated circuits 752A-752H and the ECC chip 1450 on the memory module. To individually program each memory integrated separately with its own identity value, a way of independently strobing each memory integrated circuit may be used to load its respective identity values that are set onto the shared address bits of the address bus.

To individually program the memory integrated circuits with the identity values on the address bus, a data qualifier on or associated with the data bus may be used to qualify the loading of a register, such as an extended mode register (EMRS), with information on the address bus. Typically with an EMRS setting command, the bits of a given register are programmed with the initialization data provided on the address bus 1401. The EMRS programming of a certain register can be qualified by the one or more data mask bits (DM) of the data mask bus 1014 or the one or more data bits (DQ) of the data bus 1402 that are coupled into each memory integrated circuit 752A-752H.

In using the data mask bits (DM) of the data mask bus 1014 as a qualifier, if a DM bit coupled to a memory integrated circuit is set to a logical 1, then a specific EMRS register of the one memory integrated circuit may be programmed with the contents on the address bus. The other memory integrated circuits may be masked out by their DM bits being set to logical 0 so that the given identity value is loaded into only one memory integrated circuit or a subset grouping of memory integrated circuits.

Note that the data mask bits (DM) of the data mask bus 1014 are typically hardwired from the memory controller 208 to the memory integrated circuits 752 of the memory module 1410. Thus, the data mask bits are not swizzled, altered in bit positions, on the memory module 1410 or the host motherboard to which the memory controller 208 is mounted. Furthermore, the data mask bits DM are not mirrored on the memory module between ranks or groups of memory integrated circuits. However, some types of memory modules that support error correction coding may not route the data mask bits of the data mask bus to the memory integrated circuits 752. This is because performing error correction coding requires that all of the data bits of the data bus are consistently transferred on each memory access, read or write. That is, during error correction coding, the data mask DM bits are unused. Thus, some manufacturers of memory modules supporting ECC may forgo routing the DM bits to the memory integrated circuits.

Note that the DQ data bits of the data bus 1402 as well as the ECC bits of the ECC data bus 1403 are routed between the memory controller 208 and the respective memory integrated circuits 752A-752H and the ECC chip 1450. However, the DQ bits may be swizzled as well as mirrored between ranks. For example, the DO bit from the memory controller 208 may be connected to a D3 data bit pin on a rank0 memory integrated circuit and a D4 data bit pin on a rank1 memory integrated circuit. Thus, single DQ bits may not be sufficiently reliable to be used to send a data strobe signal to independently program each memory integrated circuit. This is because you may not know which single data bit pin is going to be strobed.

To overcome the swizzling and mirroring, all the DQ data bit pins into a memory integrated circuit may be coincidentally strobed together to generate a load signal. An AND gate, for example, having an input coupled to each data bit pin of the memory integrated circuit can detect the coincidental strobing (active high) of the data bit pins together. A NOR gate, for example, having an input coupled to each data bit pin of the memory integrated circuit can detect the coincidental strobing (active low) of the data bit pins together.

The memory controller 208 can determine the data bit widths of the memory integrated circuits 752 that are mounted onto each memory module 1410. The serial presence detect (SPD) bits stored in an EPROM mounted on a memory module may be read by the memory controller to make this determination. With this information, it can determine how the width of the data bus 1404 and its bits are coupled into each memory integrated circuit. For example, with 8-bit wide memory integrated circuits, data bits DQ[7:0] of the data bus 1404 are coupled into memory integrated circuit 752A.

To program the EMRS bits with information off the address bus, all of the DQ bits connected to a certain memory integrated circuit may be driven to logic level '1' coincidentally. Continuing with the example of 8-bit wide memory integrated circuits, data bits DQ[7:0] of the data bus 1404 coupled into memory integrated circuit 752A are driven to a logical '1' to trigger the generation of a load signal to load the register with the identity bits. When the DQ [7:0] bits are all asserted (logic high), the values on the address bus are loaded into a specific EMRS register in memory integrated circuit 752A during an EMRS programming mode.

Memory integrated circuits often have more that one bank of memory to store data at a given address. The banks of memory in a memory integrated circuit are addressed by the bank address bits, such as bits BA[2:0] for a memory integrated circuit with eight banks. There may be an EMRS register for each bank within a memory integrated circuit. In a device with eight banks, there may be eight EMRS registers. In EMRS programming mode, a given EMRS register is selected for programming based on the bank address provided by the bank address bits BA[2:0]. EMRS register zero (EMRS0) is selected with a bank address of BA0 or '000'. EMRS register one (EMRS1) is selected with a bank address of BA1 or '001' and so on and so forth. A dedicated EMRS register or a subset of the register, a couple of bits, can be qualified (a.k.a., triggered) with the corresponding DQ bits coupled to the memory integrated circuit to store the identity bits of the identity value. That is, not all of the EMRS registers in a memory integrated circuit need be loaded with an identity value so that the bank address bits may be unused when loading identity values. Thus, the address lines for the bank address bits, such as bits BA[2:0] to address eight banks, may also be used to set, carry, and load identity bits into the memory integrated circuits.

A memory rank, sometimes referred to as just a "rank", is a block or area of data storage that is created using some or all the memory chips on a memory module. A rank is typically has a data width of 64-bits. On memory modules supporting error correction coding (ECC), an additional data width of 8-bits is added for a total data width of 72-bits for a rank that includes ECC. Depending on how memory modules are designed, a memory module may have one, two, or four ranks of 64-bit wide data storage areas (or 72-bit wide data storage areas when ECC is supported).

Multiple memory integrated circuits that are within a given rank can be programmed to the same identity value using a single EMRS command. For example consider that memory integrated circuits 752A and 752B illustrated in FIG. 14 are in the same memory rank. The registers in both of memory integrated circuits 752A and 752B can be programmed to the same value using a single EMRS command by qualifying all of the corresponding DQ bits coupled to both memory integrated circuits 752A and 752B. That is, all of the corresponding DQ bits coupled to both memory integrated circuits 752A and 752B are coincidentally set to a logical '1' in order to generate a load signal to store the same identity bits on the address bus into the registers in each.

In this manner, mode registers are loaded with the identity values delivered on the address lines. Address lines are common to all dynamic random access memory integrated circuits and are typically common to all devices in a memory channel, including memory modules, such as a dual inline memory module (DIMM).

While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

When implemented in software, the elements of the embodiments of the invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a read only memory (ROM), a flash memory, an erasable programmable read only memory (EPROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

What is claimed is:

1. In a memory module with a plurality of memory integrated circuits providing a Unified Memory Architecture (UMA), each of the plurality of memory integrated circuits having at least two pins to couple information into each of the memory integrated circuits, method comprising:

setting values of at least two identity bits respectively onto the at least two pins of each memory integrated circuit of the UMA;

receiving the at least two identity bits into each memory integrated circuit of the UMA as an identity value;

using a data qualifier to individually program each of the memory integrated circuits with the at least two identity bits, wherein accesses into each memory integrated circuit are micro-tile memory accesses utilizing at least the two identity bits, wherein the micro-tile memory accesses comprise independent sub-channel memory accesses into the at least one memory integrated circuit;

retrieving data from at least one of the memory integrated circuits via the independent sub-channel memory accesses; and returning a cache line having the retrieved data, wherein the retrieved data comprises data from discontiguous memory locations as a single cache line.

2. The method of claim 1, wherein the programming of the values of the at least two identity bits into the memory integrated circuits includes independently coupling the at least two pins to power or ground.

3. The method of claim 2, wherein a first pin is coupled to ground and a second pin is coupled to power to set the values of the at least two identity bits onto the at least two pins of the one memory integrated circuit.

4. The method of claim 2, wherein a first pin and a second pin are coupled to ground to set the values of the at least two identity bits onto the at least two pins of the one memory integrated circuit.

5. The method of claim 2, wherein a first pin and a second pin are coupled to power to set the values of the at least two identity bits onto the at least two pins of the one memory integrated circuit.

6. The method of claim 2, wherein the independent coupling is by one or more jumper wires coupled between the at least two pins and power or ground.

7. The method of claim 2, wherein the independent coupling is by switching one or more switches coupled between the at least two pins and power or ground.

8. The method of claim 2, wherein the at least two pins are at least two dedicated identity bit pins.

9. The method of claim 1, wherein the at least two pins are at least two data pins of a data bus, and each of the plurality of memory integrated circuits of the memory module includes a register to store the values of the at least two identity bits.

10. The method of claim 9, wherein the values of the at least two identity bits on the at least two data pins are loaded into the register in response to a load strobe coupled into the one memory integrated circuit.

11. The method of claim 9, wherein the values of the at least two identity bits on the at least two data pins are loaded into the register in response to a predetermined count of clock cycles following reset of the one memory integrated circuit.

12. The method of claim 1, wherein the at least two pins are at least two address pins of an address bus, each of the plurality of memory integrated circuits of the memory module includes a register to store the values of the at least two identity bits, and the values of the at least two identity bits on the at least two address pins are loaded into the register in response to a plurality of data bus bits being asserted to a predetermined logic level when the one memory integrated circuit is in an extended mode register programming mode.

13. A Unified Memory Architecture (UMA) comprising a plurality of memory integrated circuits, each memory integrated circuit including:
   a memory array to store data;
   a register including one or more bit storage circuits to store one or more identity bits; and
   control logic coupled to the register, the control logic to provide independent sub-channel memory access into the memory integrated circuit in response to the one or more identity bits stored in the register, wherein the register of each memory integrated circuit in the UMA is individually programmed using a data qualifier, and the one or more identity bits are one or more sub-channel select bits, the control logic further to retrieve data from the memory array via the independent sub-channel memory accesses return a cache line having the retrieved data, wherein the retrieved data comprises data from discontiguous memory locations as a single cache line.

14. The memory integrated circuit of claim 13, wherein the control logic to provide independent sub-channel memory access into the memory integrated circuit in further response to an enable bit.

15. The memory integrated circuit of claim 13, further comprising: a counter coupled to the register and a clock signal, the counter to count a number of cycles of the clock signal following reset and generate a load signal in response to reaching a predetermined count of clock cycles, and wherein the load signal to clock the one or more bit storage circuits to store the one or more identity bits.

\* \* \* \* \*